(12) United States Patent
Kubota et al.

(10) Patent No.: US 9,091,837 B2
(45) Date of Patent: Jul. 28, 2015

(54) IMAGING LENS

(71) Applicants: OPTICAL LOGIC INC., Nagano (JP); KANTATSU CO., LTD., Tochigi (JP)

(72) Inventors: Yoji Kubota, Nagano (JP); Kenichi Kubota, Nagano (JP); Hitoshi Hirano, Nagano (JP); Yoshio Ise, Tochigi (JP); Sayuri Noda, Tochigi (JP)

(73) Assignees: OPTICAL LOGIC INC., Nagano (JP); KANTATSU CO., LTD., Tochigi (JP)

( * ) Notice: Subject to any disclaimer, the term of this patent is extended or adjusted under 35 U.S.C. 154(b) by 0 days.

(21) Appl. No.: 14/595,272

(22) Filed: Jan. 13, 2015

(65) Prior Publication Data

US 2015/0124339 A1    May 7, 2015

Related U.S. Application Data

(63) Continuation of application No. 14/483,224, filed on Sep. 11, 2014, which is a continuation of application No. 13/963,488, filed on Aug. 9, 2013, now Pat. No. 8,861,099.

(30) Foreign Application Priority Data

Aug. 17, 2012 (JP) .................... 2012-180834

(51) Int. Cl.
*G02B 3/02* (2006.01)
*G02B 13/18* (2006.01)
*G02B 9/62* (2006.01)
*G02B 13/00* (2006.01)
*G02B 5/00* (2006.01)

(52) U.S. Cl.
CPC ............. *G02B 9/62* (2013.01); *G02B 13/0045* (2013.01); *G02B 5/005* (2013.01); *G02B 13/002* (2013.01); *G02B 13/0015* (2013.01); *G02B 13/18* (2013.01)

(58) Field of Classification Search
CPC ...... G02B 13/0045; G02B 9/62; G02B 13/18; G02B 13/0015; G02B 13/002; G02B 5/005
USPC .................... 359/713, 739, 740, 756, 757
See application file for complete search history.

(56) References Cited

U.S. PATENT DOCUMENTS

| | | | |
|---|---|---|---|
| 8,310,767 B2 * | 11/2012 | Huang et al. ................ | 359/713 |
| 8,749,896 B2 * | 6/2014 | Shinohara .................... | 359/713 |
| 8,861,099 B2 | 10/2014 | Kubota et al. | |
| 2013/0314804 A1 * | 11/2013 | Kubota et al. ............... | 359/757 |
| 2013/0342918 A1 * | 12/2013 | Kubota et al. ............... | 359/713 |
| 2014/0071543 A1 * | 3/2014 | Shinohara .................... | 359/713 |
| 2014/0185150 A1 * | 7/2014 | Shinohara et al. ........... | 359/713 |
| 2015/0022904 A1 * | 1/2015 | Huang ......................... | 359/713 |

FOREIGN PATENT DOCUMENTS

JP       2011-145315 A    7/2011

* cited by examiner

*Primary Examiner* — Evelyn A Lester
(74) *Attorney, Agent, or Firm* — Kubotera & Associates, LLC

(57) ABSTRACT

An imaging lens includes a first lens having positive refractive power; a second lens having negative refractive power; a third lens; a fourth lens; a fifth lens; and a sixth lens. The fifth lens is formed in a shape so that a surface thereof on the object side and a surface thereof on the image plane side have negative curvature radii. The sixth lens is formed in a shape so that a surface thereof on the object side and a surface thereof on the image plane side have positive curvature radii. The fourth to sixth lenses have specific Abbe's numbers to satisfy specific conditions.

19 Claims, 15 Drawing Sheets

IMAGING LENS

CROSS-REFERENCE TO RELATED APPLICATIONS

This is a continuation application of a prior application Ser. No. 14/483,224, filed on Sep. 11, 2014, pending, which is a continuation application of a prior application Ser. No. 13/963,488, filed on Aug. 9, 2013, allowed and issued as U.S. Pat. No. 8,861,099.

BACKGROUND OF THE PRESENT INVENTION AND RELATED ART STATEMENT

The present invention relates to an imaging lens for forming an image of an object on an imaging element such as a CCD sensor and a CMOS sensor. In particular, the present invention relates to an imaging lens suitable to be mounted in a relatively small camera such as a camera built in a portable device such as a cellular phone and a portable information terminal, a digital still camera, a security camera, a vehicle onboard camera, and a network camera.

In these years, in place of cellular phones that are intended mainly for making phone calls, so-called "smartphones" have been more widely used, i.e., a cellular phones with such functions as those of portable information terminals (PDA) and/or personal computers. Since the smartphones generally are highly functional as opposed to the cellular phones, it is possible to use images taken by a camera thereof in various applications. For example, in case of the smartphone, while it is possible to use for printing and enjoying images taken as of its intended use, it is also possible to use in additional uses such as processing images to be used in games or for makeup simulations, dress fitting simulations, and the others. Such uses of the images, which were not conventionally common, are becoming increasingly popular every year.

Generally speaking, a product group of cellular phones and smartphones is often composed of products with various specifications such as those for beginner users and those for advanced user. Among them, an imaging lens to be mounted in the cellular phone or the smartphone, which is developed for advanced users, is required to have a high resolution lens configuration so as to be also applicable to a high pixel count imaging element of these days. However, as the imaging lens to be mounted in smartphones used for the above-described usages, it is critical to be a small size with a wide angle of view, that is, a wide angle, than having a high resolution. Especially in these days, with advancements in downsizing and high performances of smartphones, an imaging lens has been required to have smaller size and wider angle of view.

Accordingly, in case of cellular phones or smartphones, depending on significance in the product group, there is slight difference in specifications of imaging lens for mounting in cellular phones and smartphones. It is preferred to choose a most preferable lens configuration for each required specification, but in view of solving problems including shortening of the product development period and cost reduction, a five-lens or six-lens configuration is desired. In a lens configuration composed of six lenses, since the number of lenses that compose an imaging lens is many, although it is slightly disadvantageous for downsizing of the imaging lens, there is flexibility in designing, so that there is potential to attain satisfactory correction of aberrations and downsizing of the imaging lens in a balanced manner. As a lens configuration composed of six lenses, for example, the one described in Patent Reference has been known.

Patent Reference: Japanese Patent Publication No. 2011-145315

The imaging lens described in Patent Reference includes a first lens that is negative and has a shape of a meniscus lens directing a convex surface thereof to an object side; a bonded lens composed of two lenses, positive and negative lenses; a fourth lens that is positive; and a bonded lens composed of two lenses, positive and negative lenses. According to the imaging lens of Patent Reference, satisfying a conditional expression about curvature radii of an object-side surface and an image plane-side surface of the first lens and conditional expressions of the two bonded lenses, it is achievable to satisfactorily correct a distortion and a chromatic aberration.

According to the imaging lens described in Patent Reference, however, since a distance from the object-side surface of the first lens to an image plane of an imaging element is long, in order to mount the imaging lens in a small camera such as cellular phones and smartphones, it is necessary to bend a light path with a prism or a mirror disposed between the imaging lens and the image plane. Functions and Sizes of cellular phones and smartphones are higher and smaller every year, and the level of downsizing required for the imaging lens is even higher than before. According to the lens configuration described in Patent Reference, it is difficult to attain satisfactory aberration while attaining downsizing of the imaging lens to meet those requirements.

Here, such problem is not a problem specific to the imaging lens to be mounted in cellular phones and smartphones. Rather, it is a common problem even for an imaging lens to be mounted in a relatively small camera such as digital still cameras, portable information terminals, security cameras, onboard cameras, and network cameras.

An object of the present invention is to provide an imaging lens that can satisfactorily correct aberrations. In addition, a second object of the present invention is to provide an imaging lens that can attain both downsizing of the imaging lens and satisfactorily corrected aberrations.

Further objects and advantages of the present invention will be apparent from the following description of the present invention.

SUMMARY OF THE PRESENT INVENTION

In order to attain the objects described above, according to a first aspect of the present invention, an imaging lens includes a first lens having positive refractive power; a second lens having negative refractive power; a third lens having positive refractive power; a fourth lens having positive refractive power; a fifth lens having negative refractive power; and a sixth lens having negative refractive power, arranged in the order from an object side to an image plane side. The first lens has an object-side surface, a curvature radius of which is positive. The second lens has an object-side surface and an image plane-side surface, curvature radii of which are both positive. The third lens has an image plane-side surface, curvature radius of which is negative. The fourth lens has an object-side surface and an image plane-side surface, curvature radii of which are both negative. The fifth lens has an object-side surface and an image plane-side surface, curvature radii of which are both negative. The sixth lens is formed in a shape so as to have negative refractive power near an optical axis and have strong positive refractive power as it is close to the lens periphery, and has an aspheric image plane-side surface having an inflexion point.

According to the first aspect of the present invention, when Abbe's numbers of the first to the sixth lenses are vd1, vd2, vd3, vd4, vd5, and vd6, the imaging lens satisfies the following conditional expressions (1) to (6):

$$45 < vd1 < 75 \tag{1}$$

$$20 < vd2 < 40 \tag{2}$$

$$45 < vd3 < 75 \tag{3}$$

$$45 < vd4 < 75 \tag{4}$$

$$20 < vd5 < 40 \tag{5}$$

$$45 < vd6 < 75 \tag{6}$$

According to the first aspect of the present invention, in the imaging lens, two of the six lenses are made from a high-dispersion material. In addition, on an image plane side of the fifth lens made of the high-dispersion material, there is provided the sixth lens made of a low-dispersion material, and the sixth lens is formed such that the image plane-side surface thereof is an aspheric shape having an inflexion point and so as to have negative refractive power near the optical axis and have strong positive refractive power as it is close to the periphery. For this reason, an off-axis light beam entered in the imaging lens goes through a positive-negative-positive-positive-negative-positive refractive power path from the first lens, and thereby an axial chromatic aberration as well as an off-axis chromatic aberration of magnification is satisfactorily corrected. Here, since the refractive power arrangement of the first, the second, and the third lenses is positive-negative-positive, the imaging lens of the present invention has a configuration that is advantageous for downsizing of the imaging lens while satisfactorily correcting aberrations.

When the imaging lens satisfies the conditional expressions (1) to (6), it is possible to satisfactorily correct the axial and off-axis chromatic aberrations. Since Abbe's numbers of four out of six lenses are greater than the lower limit of "45", chromatic aberrations generated in those four lenses are effectively restrained and a chromatic aberration of the whole lens system is suitably restrained within satisfactory range. Moreover, having the Abbe's number of each lens smaller than the upper limit of "75", it is possible to restrain the cost of the lens materials.

According to a second aspect of the present invention, when the whole lens system has a focal length f and a composite focal length of the fifth lens and the sixth lens is f56, the imaging lens having the above-described configuration preferably satisfies the following conditional expression (7):

$$-1.0 < f56/f < -0.3 \tag{7}$$

When the imaging lens satisfies the conditional expression (7), it is possible to define negative refractive powers of two lenses disposed on the image plane side, and downsize the imaging lens while restraining an incident angle of a light beam emitted from the imaging lens to an imaging element. In addition, it is also possible to restrain an astigmatism and a chromatic aberration within satisfactory ranges. As well known, in case of an imaging element of a CCD sensor, a CMOS sensor, or the like, there is set in advance a so-called chief ray angle (CRA), which is a range of an incident angle of a light beam that can be taken in the sensor. Restraining the incident angle of a light beam emitted from the imaging lens to an image plane within the CRA range, it is possible to suitably restrain generation of shading phenomenon, which is a phenomenon of generation of an image with dark periphery.

When the value exceeds the upper limit of "−0.3" in the conditional expression (7), since a composite refractive power of the fifth lens and the sixth lens is strong relative to the refractive power of the whole lens system, although it is advantageous for downsizing of the imaging lens, a back focal length is short, so that it is difficult to secure space for disposing an insert such as an infrared cut-off filter. Moreover, since the astigmatic difference increases, it is difficult to obtain satisfactory image-forming performance.

Furthermore, in this case, since a position of an exit pupil moves to the image plane side, an incident angle of a light beam emitted from the imaging lens to the imaging element is large, so that it is difficult to restrain generation of the shading. On the other hand, when the value is below the lower limit of "−1.0", since the composite refractive power of the fifth lens and the sixth lens is weak relative to the refractive power of the whole lens system, the axial chromatic aberration is insufficiently corrected (a focal position at a short wavelength moves towards the object side relative to a focal position at a reference wavelength). In addition, a chromatic aberration of magnification to an off-axis light beam is insufficiently corrected (an image-forming point at a short wavelength moves in a direction to get close to the optical axis relative to an image-forming point at a reference wavelength) in image periphery, so that it is difficult to obtain satisfactory image-forming performance.

According to a third aspect of the present invention, when the whole lens system has the focal length f and the composite focal length of the first lens and the second lens is f12, the imaging lens having the above-described configuration preferably satisfies the following conditional expression (8):

$$1.1 < f12/f < 3.0 \tag{8}$$

When the imaging lens satisfies the conditional expression (8), it is possible to satisfactorily correct a spherical aberration and a field curvature, while attaining downsizing of the imaging lens. When the value exceeds the upper limit of "3.0", the composite refractive power of the first lens and the second lens is weak relative to the refractive power of the whole lens system, so that the back focal length is long and it is difficult to attain downsizing of the imaging lens. Moreover, the image-forming surface curves to the image plane side and the astigmatic difference increases, so that it is difficult to obtain satisfactory image-forming performance.

On the other hand, when the value is below the lower limit of "1.1", the composite refractive power of the first lens and the second lens is strong relative to the refractive power of the whole lens system, although it is advantageous for downsizing of the imaging lens, an image-forming surface curves to the object side and a sagittal image surface of the astigmatism tilts to the object side, so that it is difficult to obtain satisfactory image-forming performance.

According to a fourth aspect of the present invention, when the first lens has the focal length f1 and the second lens has the focal length f2, the imaging lens having the above-described configuration preferably satisfies the following conditional expression (9):

$$-0.8 < f1/f2 < -0.3 \tag{9}$$

When the imaging lens satisfies the conditional expression (9), it is possible to restrain the chromatic aberration, the astigmatism, and the field curvature within satisfactory ranges, while attaining downsizing of the imaging lens. When the value exceeds the upper limit of "−0.3", the first lens has strong refractive power relative to the second lens, and the axial chromatic aberration is insufficiently corrected. In addition, since periphery of the sagittal image surface of the astigmatism tilts to the image plane side and the astigmatic difference and the field curvature increase, it is difficult to obtain satisfactory image-forming performance.

On the other hand, when the value is below the lower limit of "−0.8", the first lens has weak refractive power relative to the second lens, so that, although it is easy to restrain the axial chromatic aberration within a satisfactory range, a position of the exit pupil moves to the object side, and it is difficult to attain downsizing of the imaging lens. Moreover, periphery of the sagittal image surface of the astigmatism tilts to the image plane side and thereby the astigmatic difference increases, so that it is difficult to obtain satisfactory image-forming performance.

According to a fifth aspect of the present invention, when the whole lens system has the focal length f and the third lens has the focal length f3, the imaging lens having the above-described configuration preferably satisfies the following conditional expression (10):

$$1.0 < f3/f < 5.0 \qquad (10)$$

When the imaging lens satisfies the conditional expression (10), it is achievable to downsize of the imaging lens and also restrain the astigmatism within satisfactory range, while restraining an incident angle of a light beam emitted from the imaging lens to the imaging element. When the value exceeds the upper limit of "5.0", the third lens has weak refractive power relative to the whole lens system and a position of the exit pupil moves to the object side. Therefore, although it is easy to restrain the incident angle of a light beam emitted from the imaging lens to the imaging element within the range of CRA, the back focal length is long, so that it is difficult to attain downsizing of the imaging lens. Moreover, a sagittal image surface of the astigmatism tilts to the image plane side and the field curvature increases, so that it is difficult to obtain satisfactory image-forming performance.

On the other hand, when the value is below the lower limit "1.0", the third lens has strong refractive power relative to that of the whole lens system, so that, although it is advantageous for downsizing of the imaging lens, it is difficult to secure the back focal length. In addition, it is difficult to restrain the incident angle of a light beam emitted from the imaging lens to the imaging element within the range of CRA. Furthermore, in this case, since the sagittal surface of the astigmatism tilts to the object side, it is difficult to obtain satisfactory image-forming performance.

According to a sixth aspect of the present invention, when the fourth lens has a focal length f4 and the fifth lens has a focal length f5, the imaging lens having the above-described configuration preferably satisfies the following conditional expression (11):

$$-0.4 < f4/f5 < -0.1 \qquad (11)$$

When the imaging lens satisfies the conditional expression (11), it is possible to restrain a field curvature and an astigmatism within satisfactory range, while restraining an incident angle of a light beam emitted from the imaging lens to the imaging element. When the value exceeds the upper limit of "−0.1", since the fourth lens has strong refractive power relative to the fifth lens, although it is advantageous for downsizing of the imaging lens, an axial chromatic aberration is insufficiently corrected. In addition, a sagittal image surface of the astigmatism tilts to the object side and the astigmatic difference increases, it is difficult to obtain satisfactory image-forming performance.

On the other hand, when the value is below the lower limit of "−0.4", the fourth lens has weak refractive power relative to the fifth lens, although it is advantageous for correction of a chromatic aberration, the image-forming surface curves to the image plane side, so that it is difficult to obtain satisfactory image-forming performance. In addition, since the back focal length is long, it is difficult to attain downsizing of the imaging lens. Furthermore, in this case, a position of the exit pupil moves towards the image plane side, so that it is difficult to restrain the incident angle of a light beam emitted from the imaging lens to the imaging element within the range of CRA.

According to the imaging lens of the present invention, it is possible to provide an imaging lens with satisfactorily corrected aberrations. In addition, it is possible to provide a small-sized imaging lens that is especially suitable for mounting in a small-sized camera, while having high resolution with satisfactorily corrected aberrations.

DETAILED DESCRIPTION OF PREFERRED EMBODIMENTS

Hereunder, referring to the accompanying drawings, embodiments of the present invention will be fully described.

FIGS. 1, 4, 7, 10, and 13 are schematic sectional views of imaging lenses in Numerical Data Examples 1 to 5 according to the embodiment, respectively. Since a basic lens configuration is the same among those Numerical Data Examples, the lens configuration of the embodiment will be described with reference to the illustrative sectional view of Numerical Data Example 1.

Figure 1:
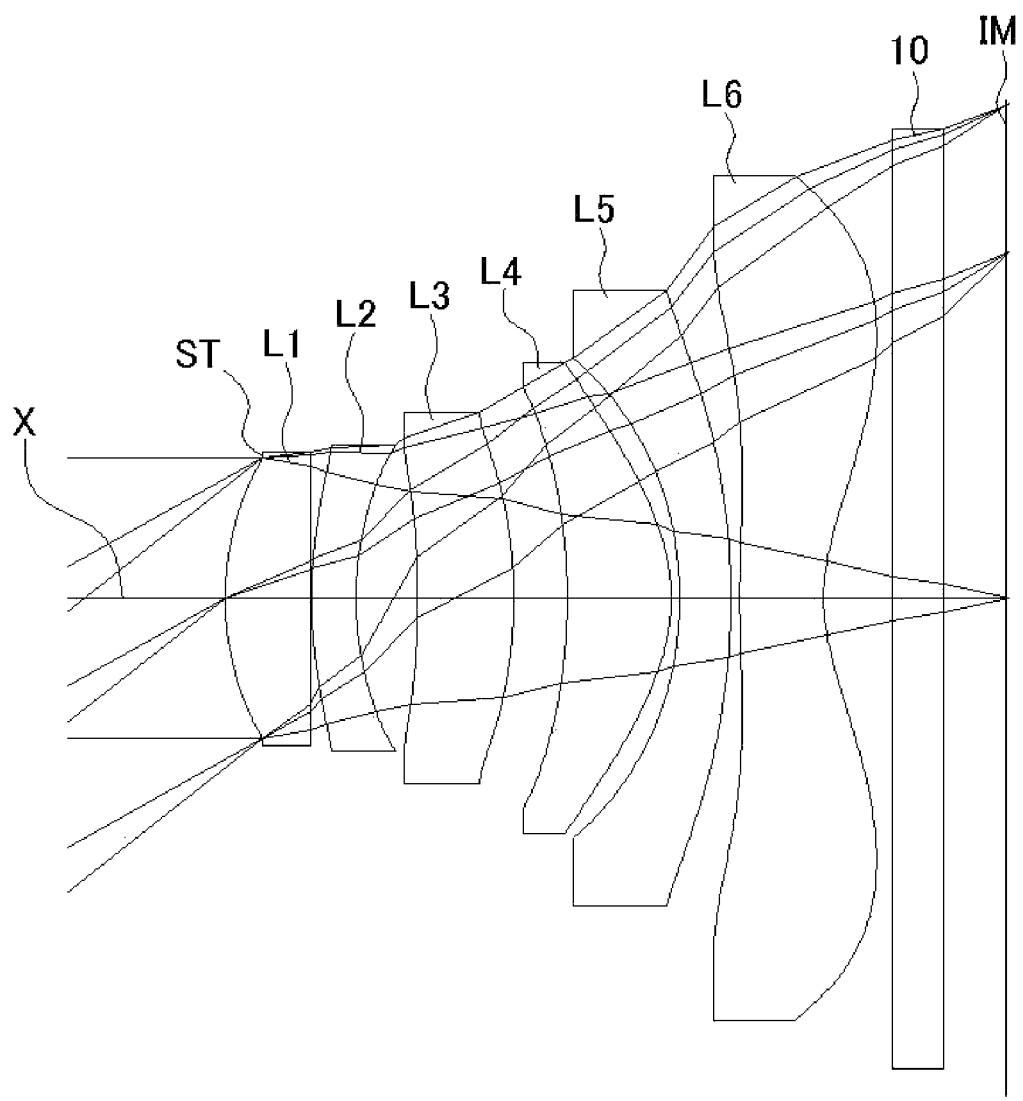
FIG. 1 shows a sectional view of a schematic configuration of an imaging lens in Numerical Data Example 1 according to an embodiment of the present invention.

As shown in FIG. 1, the imaging lens of the embodiment includes an aperture stop ST; a first lens L1 having positive refractive power; a second lens L2 having negative refractive power; a third lens L3 having positive refractive power; a fourth lens L4 having positive refractive power; a fifth lens L5 having negative refractive power; and a sixth lens L6 having negative refractive power, arranged in the order from an object side to an image plane side. A filter 10 may be provided between the sixth lens L6 and an image plane IM of an imaging element. The filter 10 may be optionally omitted.

According to the imaging lens having the above-described configuration, the first lens L1 is formed in a shape such that a curvature radius r1 of an object-side surface thereof and a curvature radius r2 of an image plane-side surface are both positive, i.e., a shape of a meniscus lens directing a convex surface thereof to an object side near an optical axis X. The shape of the first lens L1 is not limited to the one in Numerical Data Example 1. The shape of the first lens L1 can be any as long as the curvature radius r1 of the object-side surface thereof is positive and can be a formed in a shape such that the curvature radius r2 of the image plane-side surface is negative, i.e., a shape of a biconvex lens near the optical axis X.

The second lens L2 is formed in a shape such that a curvature radius r3 of an object-side surface thereof and a curvature radius r4 of an image plane-side surface are both positive, i.e., a shape of a meniscus lens directing a convex surface thereof to the object side near the optical axis X.

The third lens L3 is formed in a shape such that a curvature radius r5 of an object-side surface thereof and a curvature radius r6 of an image plane-side surface are both negative, i.e., a shape of a meniscus lens directing a concave surface thereof to the object side near the optical axis X. The shape of the third lens L3 is not limited to the one in Numerical Data Example 1. The shape of the third lens L3 can be any as long as the curvature radius r6 of the image plane-side surface thereof is negative, and can be a formed in a shape such that the curvature radius r5 of the object-side surface is positive, i.e., a shape of a biconvex lens near the optical axis X. Numerical Data Examples 2 and 3 are examples, in which the shape of the third lens L3 is a biconvex lens near the optical axis X.

The fourth lens L4 is formed in a shape such that a curvature radius r7 of an object-side surface thereof and a curvature radius r8 of an image plane-side surface are both negative, i.e., a shape of a meniscus lens directing a concave surface thereof to the object side near the optical axis X.

The fifth lens L5 is formed in a shape such that a curvature radius r9 of an object-side surface thereof and a curvature radius r10 of an image plane-side surface are both negative, i.e., a shape of a meniscus lens directing a concave surface thereof to the object side near the optical axis X.

The sixth lens L6 is formed in a shape such that a curvature radius r11 of an object-side surface thereof and a curvature radius r12 of an image plane-side surface are both positive, i.e., a shape of a meniscus lens directing a convex surface thereof to the object side near the optical axis X. In addition, the object-side surface and the image plane-side surface thereof are formed as aspheric shapes having an inflexion point. More specifically, the sixth lens L6 is formed in a shape so as to have negative refractive power near the optical axis X and have strong positive refractive power as it is close to the lens periphery. With such shape of the sixth lens L6, an off-axis light beam entered in the imaging lens goes through a positive-negative-positive-positive-negative-positive refractive power path from the first lens L1, so that an axial chromatic aberration as well as an off-axis chromatic aberration of magnification is satisfactorily corrected. Moreover, an incident angle of a light beam emitted from the imaging lens to the image plane IM is suitably restrained within a range of Chief Ray Angle (CRA).

Here, according to the embodiment, the sixth lens L6 is formed as an aspheric shape such that both the object-side surface and the image plane-side surface thereof have an inflexion point, but is not necessarily formed as an aspheric shape such that those surfaces have an inflexion point. Even when only one of those surfaces is formed as an aspheric surface having an inflexion point, it is still possible to form the sixth lens L6 in a shape so as to have negative refractive power near the optical axis X and have strong positive refractive power as it is close to the lens periphery. Whether both surfaces of the six lens L6 have an inflexion point or only one surface thereof has an inflexion point often depends on optical performances required for the imaging lens, but in view of restraining the incident angle of a light beam emitted from the imaging lens to the image plane IM within the range of CRA, it is preferred to have an inflexion point at least on the image plane-side surface of the sixth lens L6.

The imaging lens of the embodiment satisfies the following conditional expressions (1) to (11):

$$45 < vd1 < 75 \tag{1}$$

$$20 < vd2 < 40 \tag{2}$$

$$45 < vd3 < 75 \tag{3}$$

$$45 < vd4 < 75 \tag{4}$$

$$20 < vd5 < 40 \tag{5}$$

$$45 < vd6 < 75 \tag{6}$$

$$-1.0 < f56/f < -0.3 \tag{7}$$

$$1.1 < f12/f < 3.0 \tag{8}$$

$$-0.8 < f1/f2 < -0.3 \tag{9}$$

$$1.0 < f3/f < 5.0 \tag{10}$$

$$-0.4 < f4/f5 < -0.1 \tag{11}$$

In the above conditional expressions:
f: Focal length of the whole lens system
f1: Focal length of a first lens L1
f2: Focal length of a second lens L2
f3: Focal length of a third lens L3
f4: Focal length of a fourth lens L4
f5: Focal length of a fifth lens L5
f12: Composite focal length of the first lens L1 and the second lens L2
f56: Composite focal length of the fifth lens L5 and the sixth lens L6
vd1: Abbe's number of the first lens L1
vd2: Abbe's number of the second lens L2
vd3: Abbe's number of the third lens L3
vd4: Abbe's number of the fourth lens L4
vd5: Abbe's number of the fifth lens L5
vd6: Abbe's number of the sixth lens L6

Here, it is not necessary to satisfy all of the conditional expressions, and it is achievable to obtain an effect corresponding to the respective conditional expression when any single one of the conditional expressions is individually satisfied.

In the embodiment, all lens surfaces of the first lens L1 to the sixth lens L6 are formed as an aspheric surface. When the aspheric surfaces applied to the lens surfaces have an axis Z in a direction of the optical axis X, a height H in a direction perpendicular to the optical axis X, a conical coefficient k, and aspheric coefficients $A_4$, $A_6$, $A_8$, and $A_{10}$, a shape of the aspheric surfaces of the lens surfaces is expressed as follows:

$$Z = \frac{\frac{H^2}{R}}{1+\sqrt{1-(k+1)\frac{H^2}{R^2}}} + A_4H^4 + A_6H^6 + A_8H^8 + A_{10}H^{10} \quad \text{[Formula 1]}$$

Next, Numerical Data Examples of the imaging lens of the embodiment will be described. In each Numerical Data Example, f represents a focal length of the whole lens system, Fno represents an F number, and ω represents a half angle of view, respectively. In addition, i represents a surface number counted from the object side, r represents a curvature radius, d represents a distance between lens surfaces (surface spacing) on the optical axis, nd represents a refractive index, and νd represents Abbe's number, respectively. Here, aspheric surfaces are indicated with surface numbers i affixed with * (asterisk).

Numerical Data Example 1

Basic Data are shown below.

f = 3.66 mm, Fno = 2.2, ω = 38.0°
Unit: mm

Surface Data

| Surface Number i | r | d | nd | νd |
|---|---|---|---|---|
| (Object) | ∞ | ∞ | | |
| 1* (Stop) | 1.664 | 0.490 | 1.5346 | 56.2(=νd1) |
| 2* | 55.973 | 0.010 | | |
| 3* | 2.584 | 0.256 | 1.6355 | 23.9(=νd2) |
| 4* | 1.736 | 0.357 | | |
| 5* | −6.143 | 0.557 | 1.5438 | 55.8(=νd3) |
| 6* | −3.031 | 0.310 | | |
| 7* | −3.571 | 0.603 | 1.5438 | 55.8(=νd4) |
| 8* | −1.087 | 0.048 | | |
| 9* | −2.172 | 0.297 | 1.6355 | 23.9(=νd5) |
| 10* | −4.137 | 0.051 | | |
| 11* | 5.706 | 0.483 | 1.5346 | 56.2(=νd6) |
| 12* | 1.014 | 0.400 | | |
| 13 | ∞ | 0.300 | 1.5168 | 64.2 |
| 14 (Image plane) | ∞ | 0.374 | | | f1 = 3.18 mm
f2 = −9.35 mm
f3 = 10.31 mm
f4 = 2.64 mm
f5 = −7.57 mm
f6 = −2.38 mm
f12 = 4.23 mm
f56 = −1.68 mm

Aspheric Surface Data

First Surface k = −3.931E−01, $A_4$ = 2.248E−02, $A_6$ = 2.869E−03, $A_8$ = 2.071E−03, $A_{10}$ = −7.364E−03
Second Surface k = 0.000, $A_4$ = −1.757E−02, $A_6$ = 5.509E−02, $A_8$ = −2.150E−02, $A_{10}$ = −5.117E−02

-continued f = 3.66 mm, Fno = 2.2, ω = 38.0°
Unit: mm

Third Surface k = −7.847, $A_4$ = −5.725E−02, $A_6$ = 1.100E−01, $A_8$ = −3.550E−02, $A_{10}$ = −6.239E−02
Fourth Surface k = 1.488, $A_4$ = −1.248E−01, $A_6$ = 4.036E−02, $A_8$ = 4.550E−02, $A_{10}$ = −5.377E−02
Fifth Surface k = 0.000, $A_4$ = −5.070E−02, $A_6$ = −2.739E−02, $A_8$ = 1.624E−02, $A_{10}$ = 9.241E−02
Sixth Surface k = 9.587E−01, $A_4$ = −3.945E−02, $A_6$ = 2.979E−02, $A_8$ = −5.416E−02, $A_{10}$ = 5.463E−02
Seventh Surface k = 1.318, $A_4$ = −1.363E−02, $A_6$ = 4.633E−03, $A_8$ = −4.068E−04, $A_{10}$ = −1.838E−03
Eighth Surface k = −1.174, $A_4$ = 1.264E−01, $A_6$ = −9.436E−02, $A_8$ = 4.639E−02, $A_{10}$ = −8.842E−03
Ninth Surface k = 4.381E−01, $A_4$ = −4.305E−02, $A_6$ = 1.826E−02, $A_8$ = −7.458E−04, $A_{10}$ = −1.245E−03
Tenth Surface k = −2.530, $A_4$ = −2.632E−03, $A_6$ = −1.464E−03, $A_8$ = −1.408E−04, $A_{10}$ = 2.518E−04
Eleventh Surface k = −4.490E+02, $A_4$ = −4.139E−02, $A_6$ = 6.768E−03, $A_8$ = 2.909E−04, $A_{10}$ = −7.624E−05
Twelfth Surface k = −6.909, $A_4$ = −4.366E−02, $A_6$ = 7.908E−03, $A_8$ = −1.354E−03, $A_{10}$ = 7.761E−05

The values of the respective conditional expressions are as follows:

$f56/f = -0.46$ $f12/f = 1.16$ $f1/f2 = -0.34$ $f3/f = 2.82$ $f4/f5 = -0.35$

Accordingly, the imaging lens of Numerical Data Example 1 satisfies the above-described conditional expressions. A distance on the optical axis X from the object-side surface of the first lens L1 to the image plane IM (length in air) is 4.43 mm, and downsizing of the imaging lens is attained.

Figure 2:
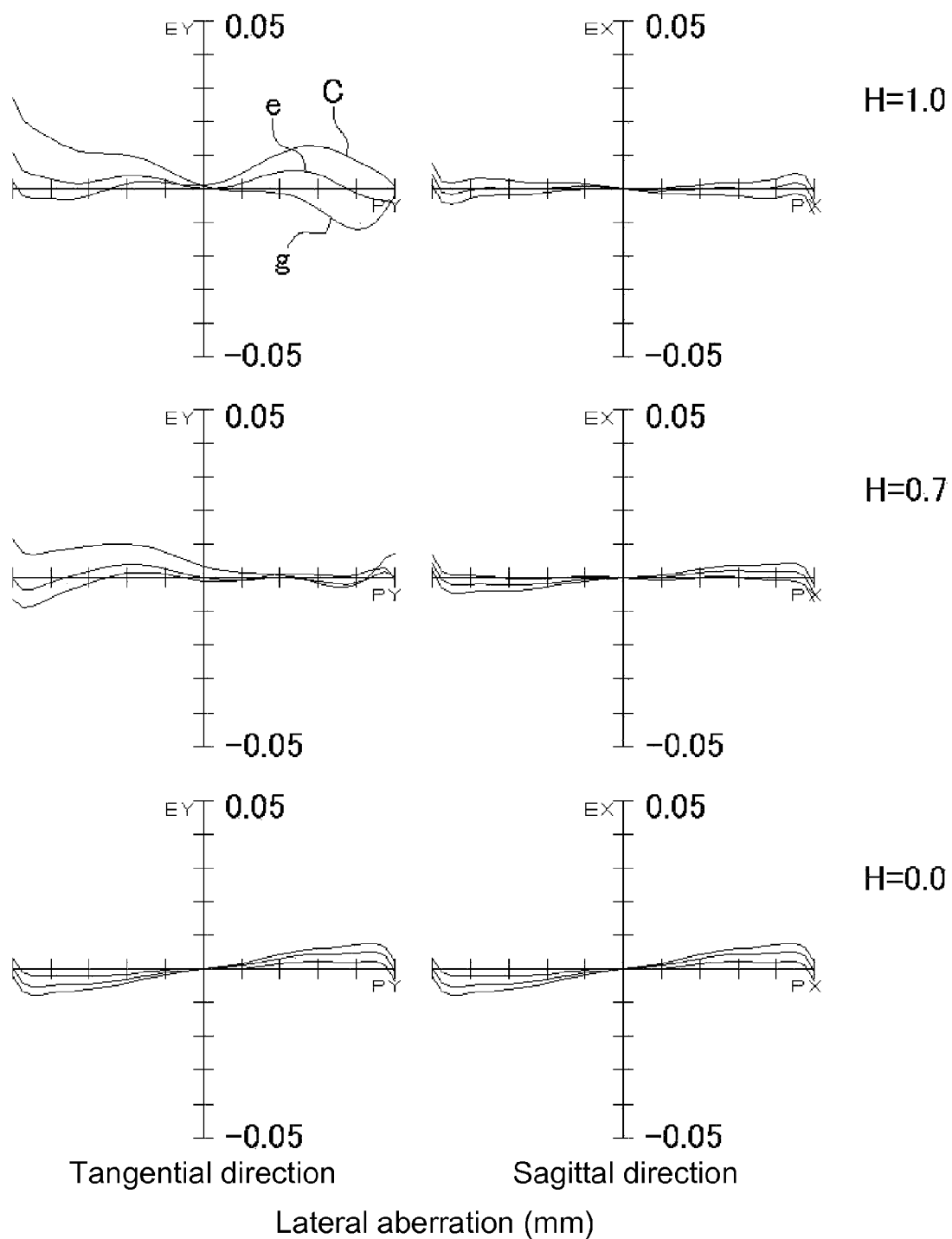
FIG. 2 is an aberration diagram showing a lateral aberration of the imaging lens of FIG. 1.
Figure 3:
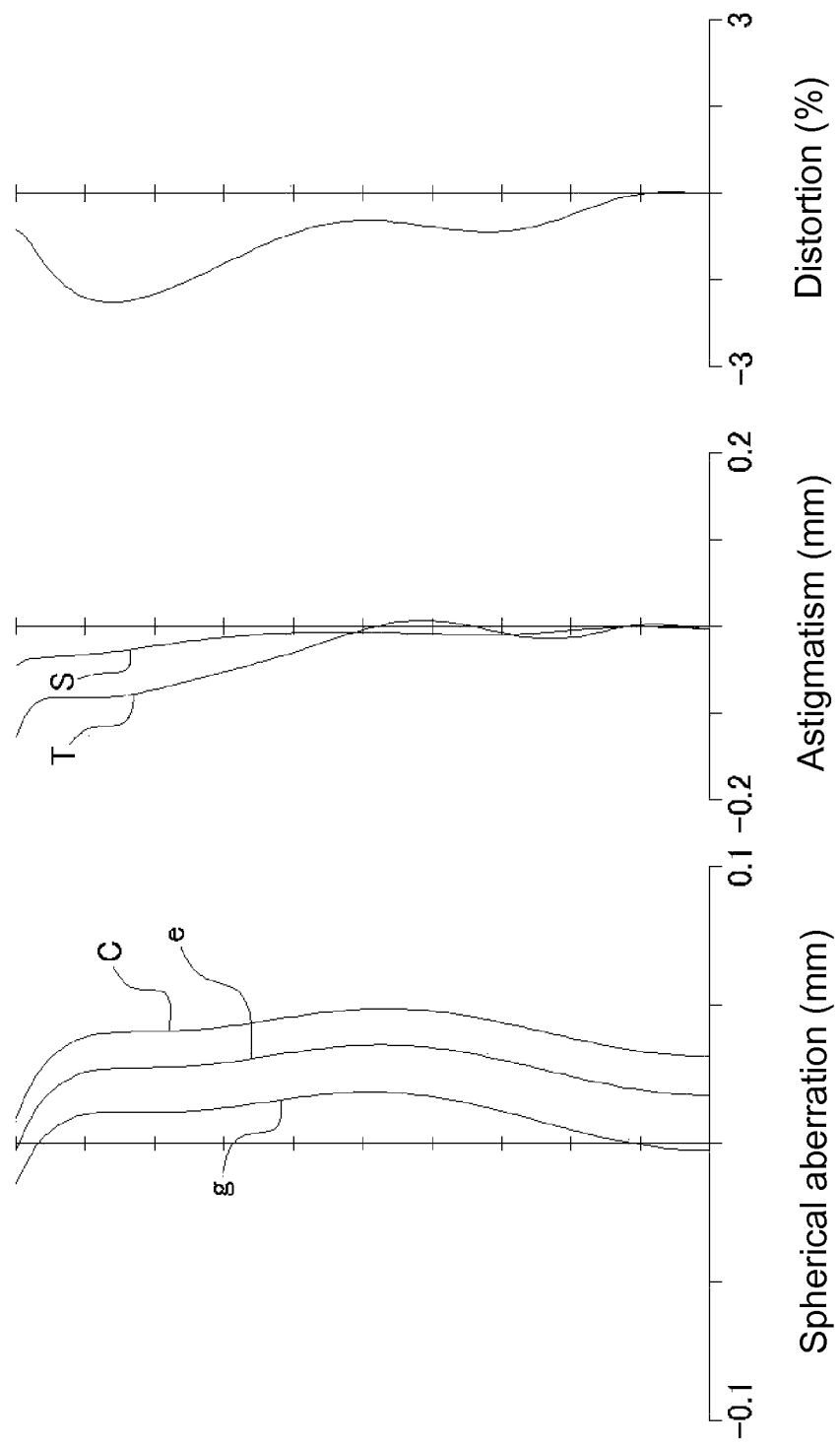
FIG. 3 is an aberration diagram showing a spherical aberration, astigmatism, and a distortion of the imaging lens of FIG. 1.
Figure 4:
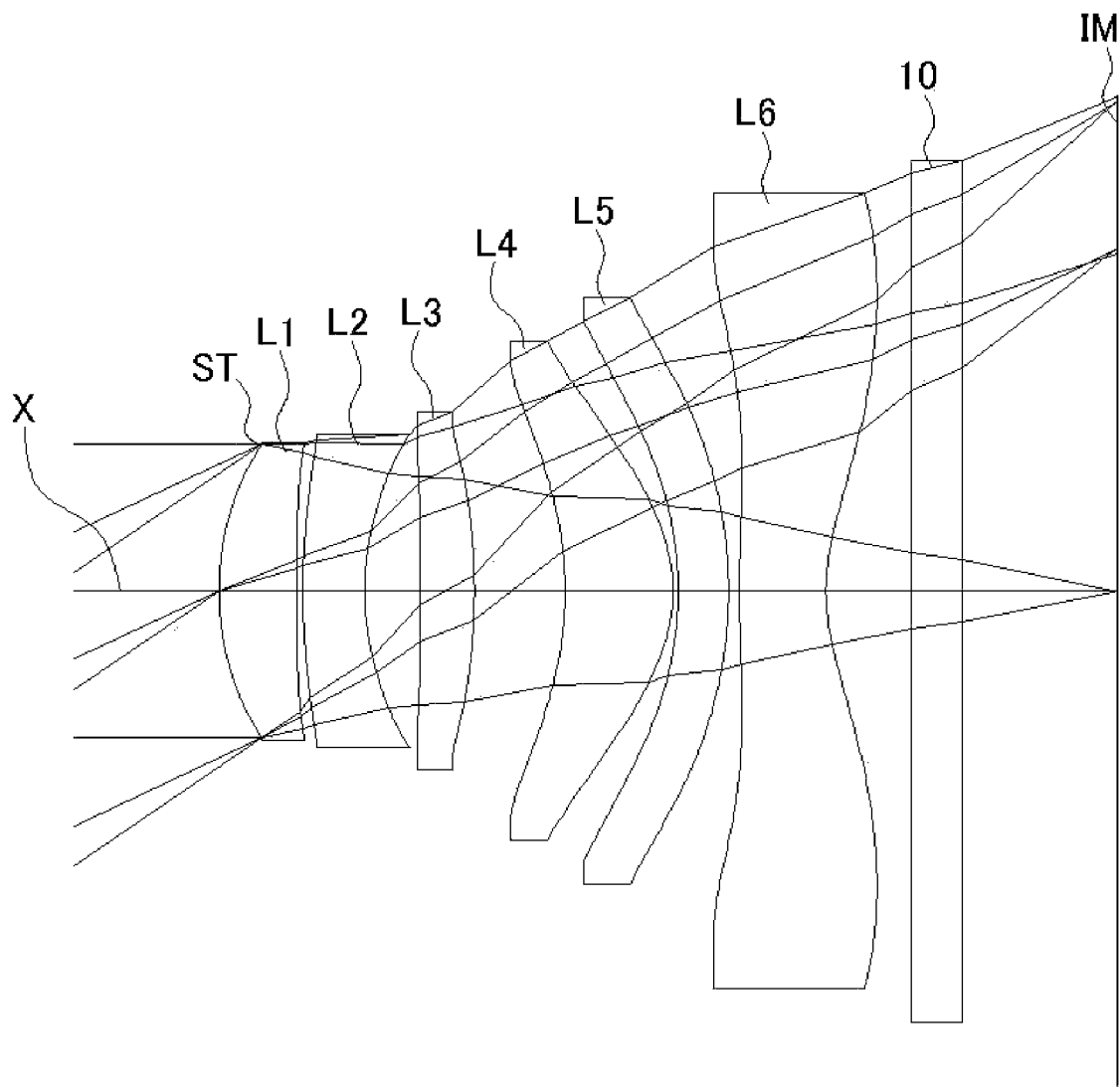
FIG. 4 shows a sectional view of a schematic configuration of an imaging lens in Numerical Data Example 2 according to the embodiment of the present invention.

FIG. 2 shows a lateral aberration that corresponds to an image height ratio H, which is divided into a tangential direction and a sagittal direction (which is the same in FIGS. 5, 8, 11, and 14). Furthermore, FIG. 3 shows a spherical aberration (mm), astigmatism (mm), and a distortion (%), respectively. In the aberration diagrams, for the lateral aberration diagrams and spherical aberration diagrams, aberrations at each wavelength, i.e., a g line (435.84 nm), an e line (546.07 nm), and a C line (656.27 nm) are indicated. In the astigmatism diagram, an aberration on a sagittal image surface S and an aberration on a tangential image surface T are respectively indicated (which are the same in FIGS. 6, 9, 12, and 15). As shown in FIGS. 2 and 3, according to the imaging lens of Numerical Data Example 1, the aberrations are satisfactorily corrected.

Numerical Data Example 2

Basic Data are shown below.

| f = 4.20 mm, Fno = 2.4, ω = 34.2° Unit: mm | | | | |
|---|---|---|---|---|
| Surface Data | | | | |
| Surface Number i | r | d | nd | νd |
| (Object) | ∞ | ∞ | | |
| 1* (Stop) | 1.678 | 0.453 | 1.5346 | 56.2(=νd1) |
| 2* | 15.190 | 0.036 | | |
| 3* | 3.693 | 0.361 | 1.6355 | 23.9(=νd2) |
| 4* | 1.585 | 0.325 | | |
| 5* | 212.104 | 0.317 | 1.5438 | 55.8(=νd3) |
| 6* | −3.973 | 0.530 | | |
| 7* | −2.088 | 0.630 | 1.5438 | 55.8(=νd4) |
| 8* | −0.941 | 0.030 | | |
| 9* | −2.086 | 0.295 | 1.6355 | 23.9(=νd5) |
| 10* | −2.654 | 0.062 | | |
| 11* | 4.257 | 0.506 | 1.5346 | 56.2(=νd6) |
| 12* | 1.097 | 0.500 | | |
| 13 | ∞ | 0.300 | 1.5168 | 64.2 |
| 14 | ∞ | 0.900 | | |
| (Image plane) | ∞ | | | | f1 = 3.47 mm
f2 = −4.64 mm
f3 = 7.15 mm
f4 = 2.63 mm
f5 = −19.07 mm
f6 = −2.92 mm
f12 = 8.29 mm
f56 = −2.37 mm

Aspheric Surface Data

First Surface $k = -4.341E-01, A_4 = 2.636E-02, A_6 = 3.346E-02, A_8 = -5.451E-02, A_{10} = 5.353E-02$ Second Surface $k = 0.000, A_4 = -3.750E-03, A_6 = 7.392E-02, A_8 = -1.196E-02, A_{10} = -1.803E-02$ Third Surface $k = -1.602E+01, A_4 = -6.074E-02, A_6 = 1.095E-01, A_8 = -2.518E-02, A_{10} = -4.920E-02$ Fourth Surface $k = 1.269, A_4 = -1.380E-01, A_6 = 3.979E-02, A_8 = 3.077E-02, A_{10} = -7.969E-02$ Fifth Surface $k = 0.000, A_4 = -4.841E-02, A_6 = -2.391E-02, A_8 = -7.584E-03, A_{10} = 7.198E-02$ Sixth Surface $k = 2.362, A_4 = -2.634E-02, A_6 = 1.985E-02, A_8 = -5.710E-02, A_{10} = 6.707E-02$ Seventh Surface $k = -2.318, A_4 = -4.166E-03, A_6 = 2.785E-03, A_8 = 5.737E-03, A_{10} = -1.015E-04$ Eighth Surface $k = -1.141, A_4 = 1.305E-01, A_6 = -8.927E-02, A_8 = 4.830E-02, A_{10} = -9.394E-03$

| f = 4.20 mm, Fno = 2.4, ω = 34.2° Unit: mm |
|---|

Ninth Surface $k = 3.883E-01, A_4 = -1.031E-02, A_6 = 2.401E-02, A_8 = -1.775E-03, A_{10} = 3.107E-04$ Tenth Surface $k = 6.565E-02, A_4 = -6.384E-03, A_6 = 1.213E-03, A_8 = 3.863E-04, A_{10} = 2.589E-04$ Eleventh Surface $k = -4.031E+02, A_4 = -3.950E-02, A_6 = 5.345E-03, A_8 = 2.809E-04, A_{10} = -2.179E-05$ Twelfth Surface $k = -8.583, A_4 = -4.045E-02, A_6 = 8.872E-03, A_8 = -1.129E-03, A_{10} = 5.618E-05$ The values of the respective conditional expressions are as follows:

$f56/f = -0.56$ $f12/f = 1.97$ $f1/f2 = -0.75$ $f3/f = 1.70$ $f4/f5 = -0.14$

Accordingly, the imaging lens of Numerical Data Example 2 satisfies the above-described conditional expressions. A distance on the optical axis X from the object-side surface of the first lens L1 to the image plane IM (length in air) is 5.14 mm, and downsizing of the imaging lens is attained.

Figure 5:
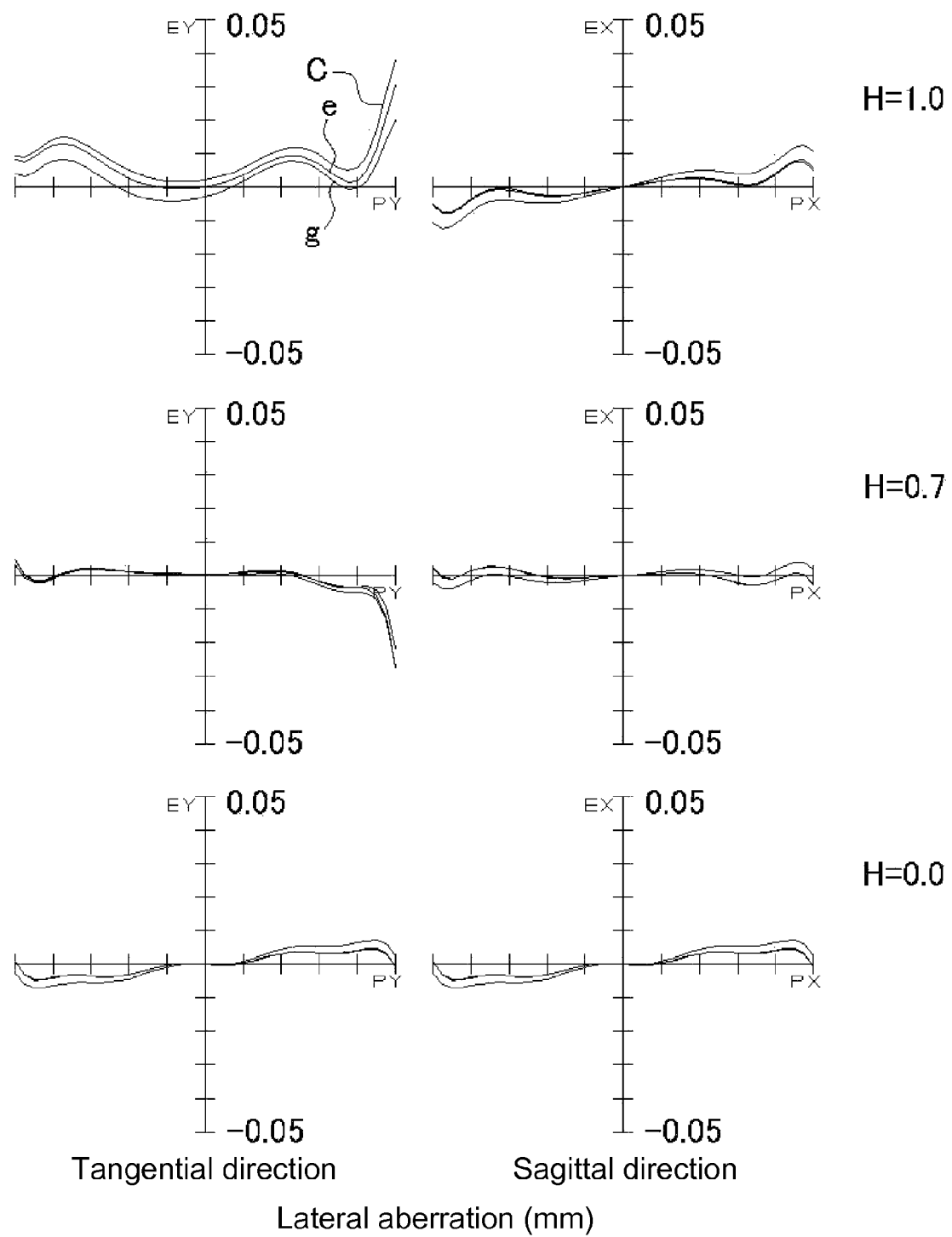
FIG. 5 is an aberration diagram showing a lateral aberration of the imaging lens of FIG. 4.
Figure 6:
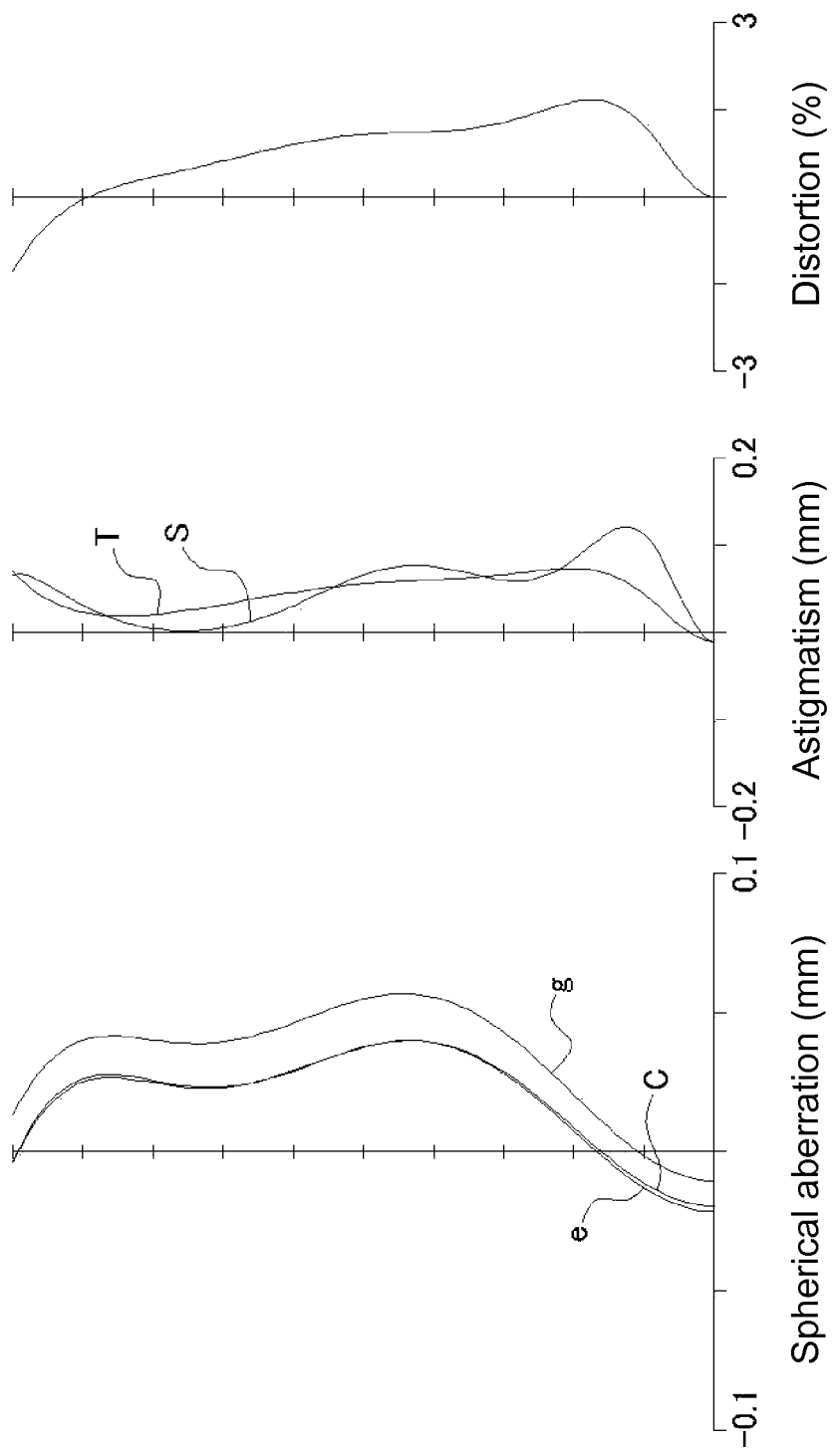
FIG. 6 is an aberration diagram showing a spherical aberration, astigmatism, and a distortion of the imaging lens of FIG. 4.
Figure 7:
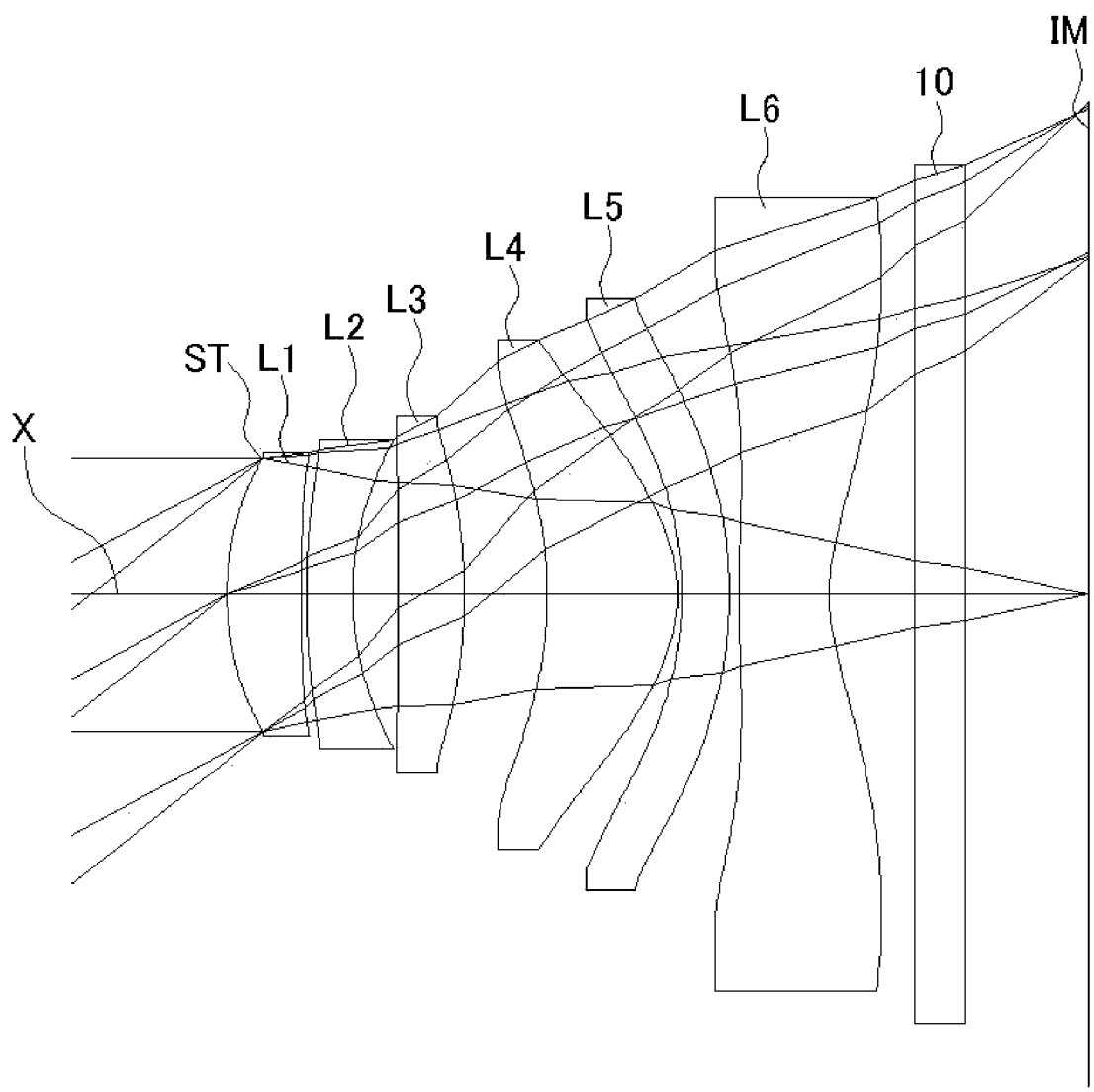
FIG. 7 shows a sectional view of a schematic configuration of an imaging lens in Numerical Data Example 3 according to the embodiment of the present invention.

FIG. 5 shows the lateral aberration that corresponds to the image height ratio H of the imaging lens, and FIG. 6 shows a spherical aberration (mm), astigmatism (mm), and a distortion (%), respectively. As shown in FIGS. 5 and 6, according to the imaging lens of Numerical Data Example 2, the aberrations are also satisfactorily corrected.

Numerical Data Example 3

Basic Data are shown below.

| f = 3.59 mm, Fno = 2.2, ω = 38.5° Unit: mm | | | | |
|---|---|---|---|---|
| Surface Data | | | | |
| Surface Number i | r | d | nd | νd |
| (Object) | ∞ | ∞ | | |
| 1* (Stop) | 1.684 | 0.431 | 1.5346 | 56.2(=νd1) |
| 2* | 12.374 | 0.030 | | |
| 3* | 3.750 | 0.270 | 1.6355 | 23.9(=νd2) |
| 4* | 1.603 | 0.268 | | |
| 5* | 32.956 | 0.385 | 1.5438 | 55.8(=νd3) |
| 6* | −3.418 | 0.486 | | |
| 7* | −2.285 | 0.758 | 1.5438 | 55.8(=νd4) |
| 8* | −0.929 | 0.026 | | |
| 9* | −2.055 | 0.278 | 1.6355 | 23.9(=νd5) |
| 10* | −2.587 | 0.055 | | |
| 11* | 3.888 | 0.526 | 1.5346 | 56.2(=νd6) |
| 12* | 1.071 | 0.500 | | |
| 13 | ∞ | 0.300 | 1.5168 | 64.2 |
| 14 | ∞ | 0.715 | | |
| (Image plane) | ∞ | | | |

-continued f = 3.59 mm, Fno = 2.2, ω = 38.5°
Unit: mm f1 = 3.58 mm
f2 = -4.59 mm
f3 = 5.69 mm
f4 = 2.39 mm
f5 = -19.59 mm
f6 = -2.95 mm
f12 = 9.89 mm
f56 = -2.39 mm Aspheric Surface Data First Surface $k = -4.846E-01, A_4 = 3.116E-02, A_6 = 4.185E-03, A_8 = -1.529E-02,$
$A_{10} = 4.070E-02$
Second Surface $k = 0.000, A_4 = -2.047E-03, A_6 = 7.998E-02, A_8 = -1.036E-02,$
$A_{10} = -1.640E-02$
Third Surface $k = -1.746E+01, A_4 = -5.647E-02, A_6 = 1.065E-01, A_8 = -2.790E-02,$
$A_{10} = -4.948E-02$
Fourth Surface $k = 1.240, A_4 = -1.414E-01, A_6 = 3.893E-02, A_8 = 2.920E-02,$
$A_{10} = -7.696E-02$
Fifth Surface $k = 0.000, A_4 = -5.042E-02, A_6 = -2.374E-02, A_8 = -7.017E-03,$
$A_{10} = 7.221E-02$
Sixth Surface $k = 1.839, A_4 = -1.899E-02, A_6 = 1.695E-02, A_8 = -6.350E-02,$
$A_{10} = 6.563E-02$
Seventh Surface $k = -2.511, A_4 = -4.250E-03, A_6 = 3.164E-03, A_8 = 5.737E-03,$
$A_{10} = -1.593E-04$
Eighth Surface $k = -1.122, A_4 = 1.245E-01, A_6 = -9.095E-02, A_8 = 4.839E-02,$
$A_{10} = -9.139E-03$
Ninth Surface $k = 3.437E-01, A_4 = -1.093E-02, A_6 = 2.490E-02, A_8 = -1.671E-03,$
$A_{10} = 3.762E-04$
Tenth Surface $k = 1.564E-02, A_4 = -4.726E-03, A_6 = 1.804E-03, A_8 = 4.641E-04,$
$A_{10} = 2.964E-04$
Eleventh Surface $k = -4.916E+02, A_4 = -3.864E-02, A_6 = 5.309E-03, A_8 = 2.892E-04,$
$A_{10} = -1.734E-05$
Twelfth Surface $k = -9.610, A_4 = -3.680E-02, A_6 = 8.626E-03, A_8 = -1.122E-03,$
$A_{10} = 5.909E-05$ The values of the respective conditional expressions are as follows:

$f56/f = -0.67$ $f12/f = 2.75$ $f1/f2 = -0.78$ $f3/f = 1.58$ $f4/f5 = -0.12$

Accordingly, the imaging lens of Numerical Data Example 3 satisfies the above-described conditional expressions. A distance on the optical axis X from the object-side surface of the first lens L1 to the image plane IM (length in air) is 4.93 mm, and downsizing of the imaging lens is attained.

Figure 8:
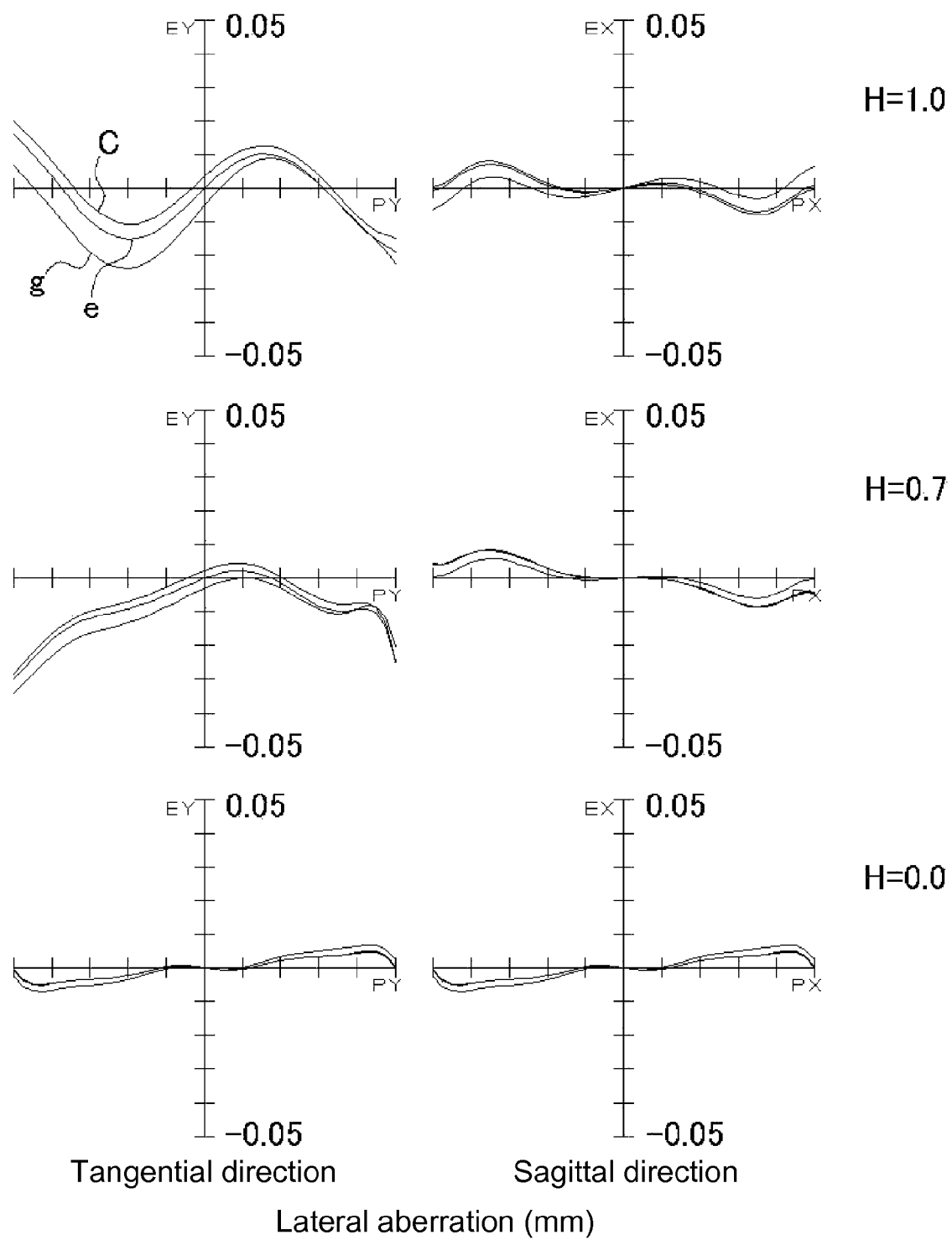
FIG. 8 is an aberration diagram showing a lateral aberration of the imaging lens of FIG. 7.
Figure 9:
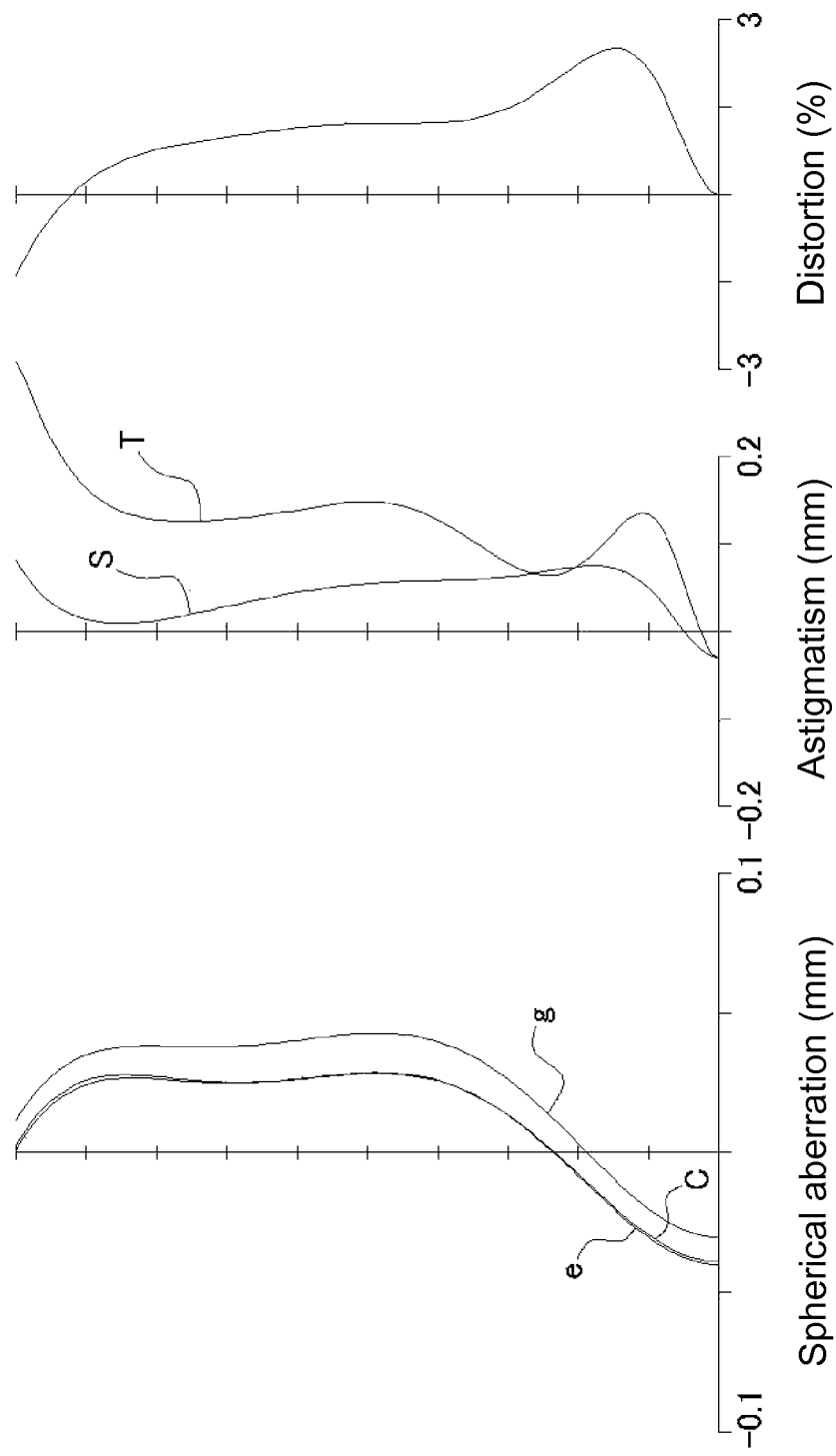
FIG. 9 is an aberration diagram showing a spherical aberration, astigmatism, and a distortion of the imaging lens of FIG. 7.
Figure 10:
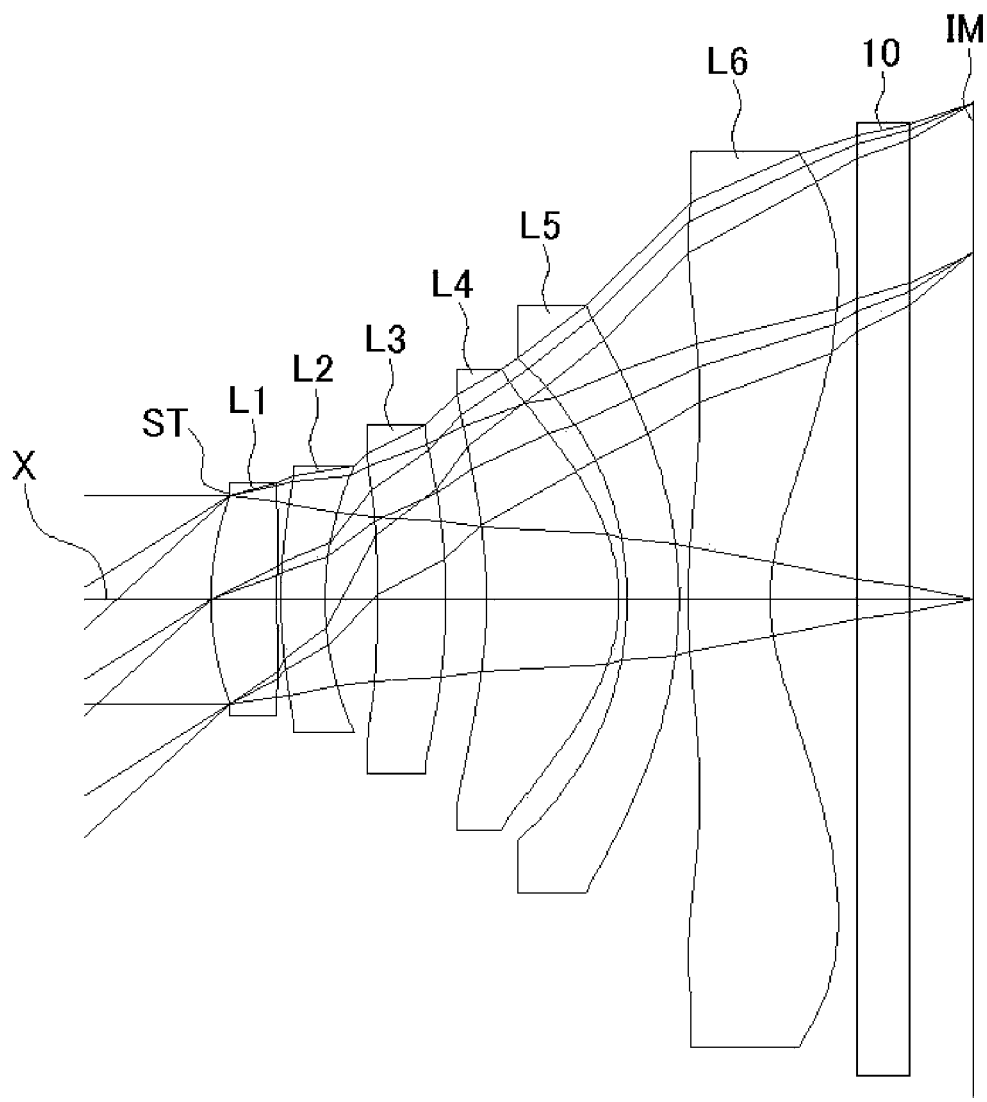
FIG. 10 shows a sectional view of a schematic configuration of an imaging lens in Numerical Data Example 4 according to the embodiment of the present invention.

FIG. 8 shows the lateral aberration that corresponds to the image height ratio H of the imaging lens, and FIG. 9 shows a spherical aberration (mm), an astigmatism (mm), and a distortion (%), respectively. As shown in FIGS. 8 and 9, according to the imaging lens of Numerical Data Example 3, the aberrations are satisfactorily corrected.

Numerical Data Example 4

Basic Data are shown below.

f = 3.07 mm, Fno = 2.6, ω = 42.9°
Unit: mm

Surface Data

| Surface Number i | r | d | nd | vd |
|---|---|---|---|---|
| (Object) | ∞ | ∞ | | |
| 1* (Stop) | 1.662 | 0.381 | 1.5346 | 56.2(=vd1) |
| 2* | 41.707 | 0.022 | | |
| 3* | 2.729 | 0.254 | 1.6355 | 23.9(=vd2) |
| 4* | 1.756 | 0.300 | | |
| 5* | -9.263 | 0.392 | 1.5438 | 55.8(=vd3) |
| 6* | -4.231 | 0.236 | | |
| 7* | -2.867 | 0.762 | 1.5438 | 55.8(=vd4) |
| 8* | -1.006 | 0.045 | | |
| 9* | -1.962 | 0.300 | 1.6355 | 23.9(=vd5) |
| 10* | -2.495 | 0.052 | | |
| 11* | 3.965 | 0.472 | 1.5346 | 56.2(=vd6) |
| 12* | 1.236 | 0.500 | | |
| 13 | ∞ | 0.300 | 1.5168 | 64.2 |
| 14 | ∞ | 0.365 | | |
| (Image plane) | ∞ | | | | f1 = 3.21 mm
f2 = -8.54 mm
f3 = 13.88 mm
f4 = 2.48 mm
f5 = -18.34 mm
f6 = -3.56 mm
f12 = 4.51 mm
f56 = -2.78 mm

Aspheric Surface Data

First Surface $k = -6.287E-01, A_4 = 1.553E-02, A_6 = -3.064E-02, A_8 = -2.019E-02,$
$A_{10} = 4.296E-02$
Second Surface $k = 0.000, A_4 = -4.017E-02, A_6 = 5.553E-02, A_8 = -1.564E-01,$
$A_{10} = -1.848E-01$
Third Surface $k = -8.206, A_4 = -6.487E-02, A_6 = 1.051E-01, A_8 = -4.760E-02,$
$A_{10} = -2.197E-01$
Fourth Surface $k = 1.613, A_4 = -8.779E-02, A_6 = 1.183E-02, A_8 = 3.013E-02,$
$A_{10} = -3.821E-02$
Fifth Surface $k = 0.000, A_4 = -7.345E-02, A_6 = -4.623E-02, A_8 = 4.608E-02,$
$A_{10} = 1.440E-01$
Sixth Surface $k = 9.088E-01, A_4 = -4.230E-02, A_6 = 4.671E-02, A_8 = -5.657E-02,$
$A_{10} = 5.686E-02$ -continued f = 3.07 mm, Fno = 2.6, ω = 42.9°
Unit: mm Seventh Surface $k = -7.126, A_4 = 1.410E-02, A_6 = -3.512E-04, A_8 = 8.811E-03,$
$A_{10} = -5.760E-03$
Eighth Surface $k = -9.449E-01, A_4 = 1.018E-01, A_6 = -7.723E-02, A_8 = 4.907E-02,$
$A_{10} = -8.899E-03$
Ninth Surface $k = 5.314E-01, A_4 = -2.140E-02, A_6 = 1.063E-02, A_8 = 2.237E-03,$
$A_{10} = 2.170E-04$
Tenth Surface $k = -1.043, A_4 = 1.871E-03, A_6 = 4.767E-04, A_8 = -4.322E-04,$
$A_{10} = 1.879E-04$
Eleventh Surface $k = -1.694E+01, A_4 = -4.537E-02, A_6 = 6.303E-03, A_8 = 2.992E-04,$
$A_{10} = -6.298E-05$
Twelfth Surface $k = -5.062, A_4 = -4.149E-02, A_6 = 8.943E-03, A_8 = -1.296E-03,$
$A_{10} = 6.832E-05$ The values of the respective conditional expressions are as follows:

$f56/f = -0.91$ $f12/f = 1.47$ $f1/f2 = -0.38$ $f3/f = 4.52$ $f4/f5 = -0.14$

Accordingly, the imaging lens of Numerical Data Example 4 satisfies the above-described conditional expressions. A distance on the optical axis X from the object-side surface of the first lens L1 to the image plane IM (length in air) is 4.28 mm, and downsizing of the imaging lens is attained.

Figure 11:
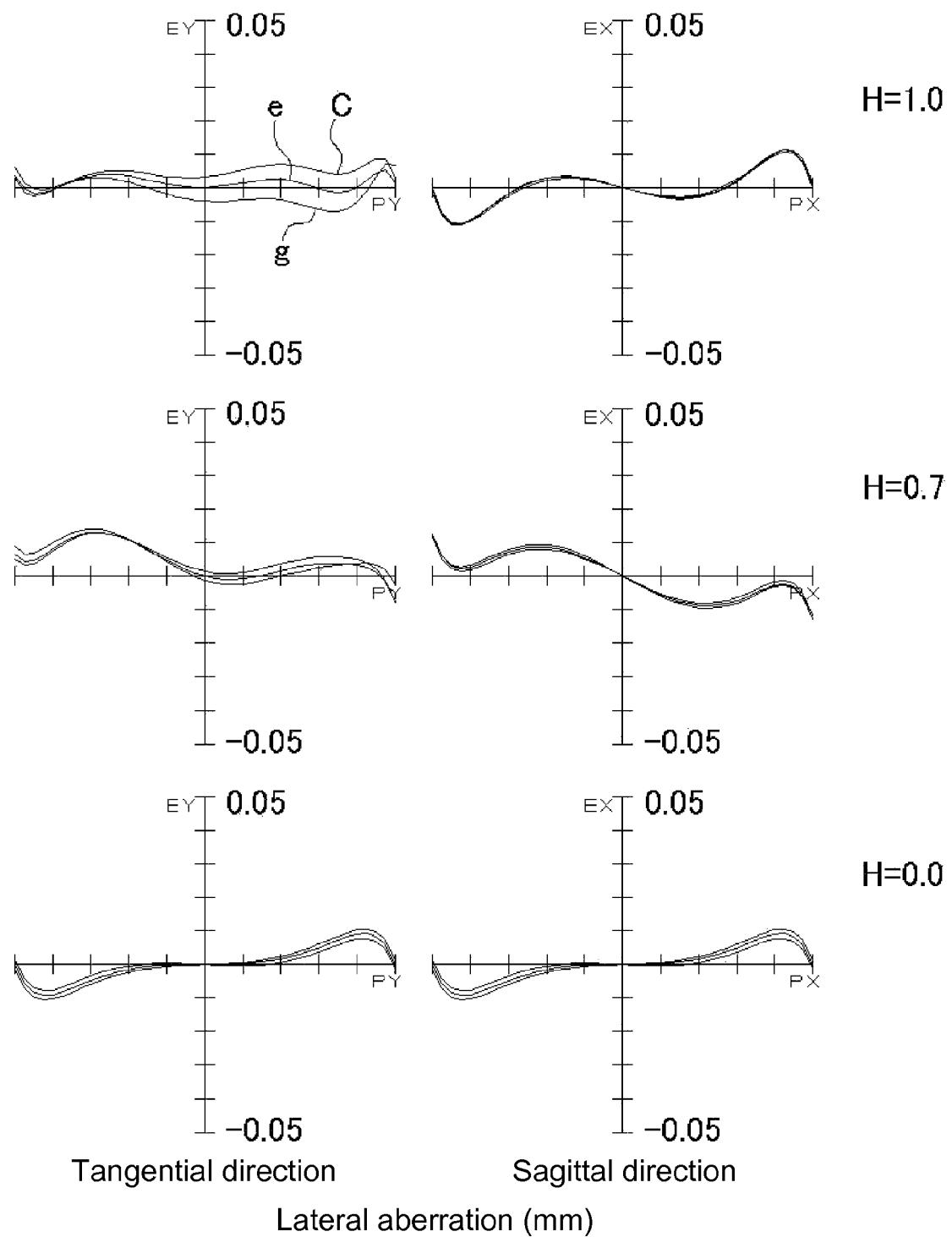
FIG. 11 is an aberration diagram showing a lateral aberration of the imaging lens of FIG. 10.
Figure 12:
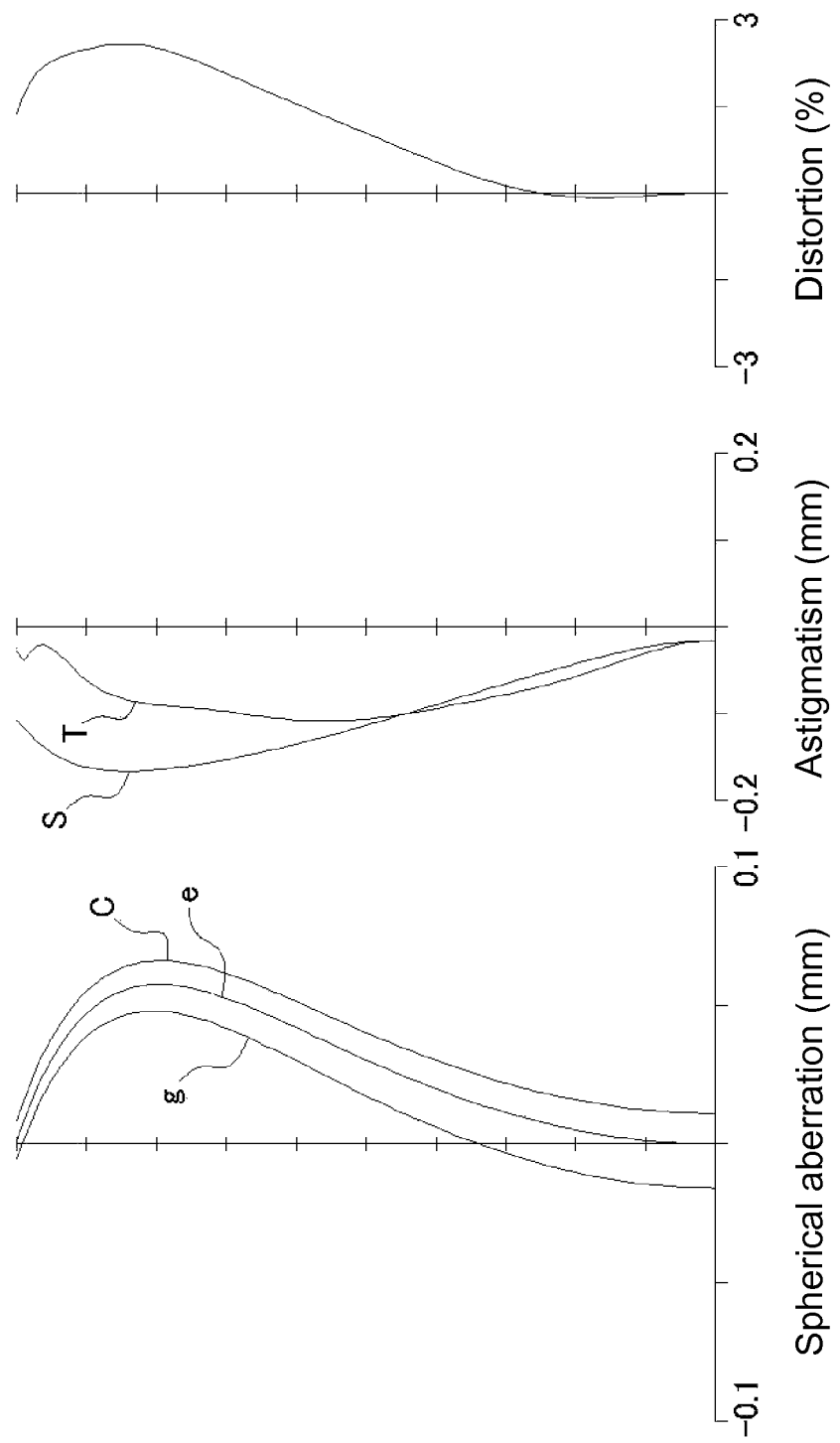
FIG. 12 is an aberration diagram showing a spherical aberration, astigmatism, and a distortion of the imaging lens of FIG. 10.
Figure 13:
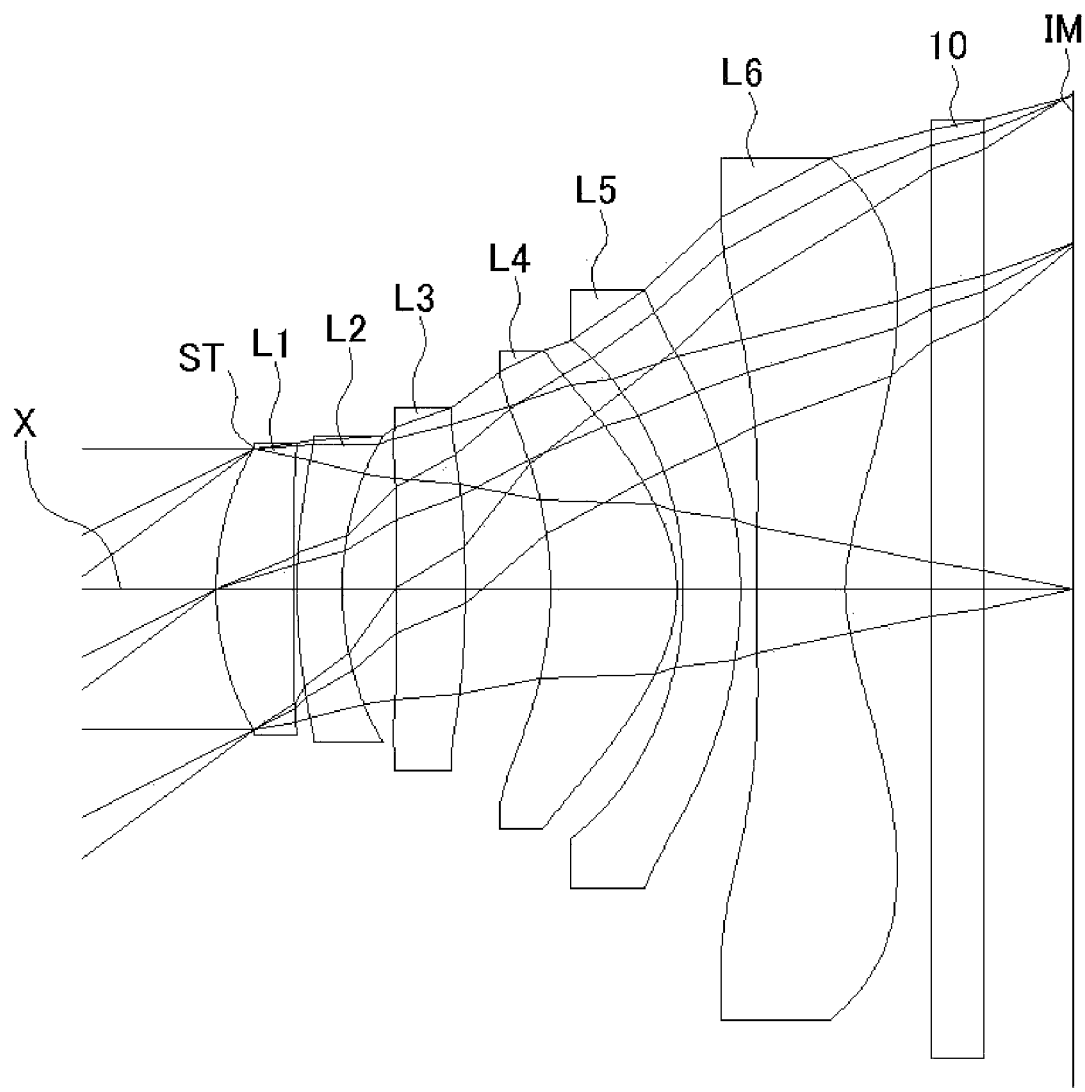
FIG. 13 shows a sectional view of a schematic configuration of an imaging lens in Numerical Data Example 5 according to the embodiment of the present invention.

FIG. 11 shows the lateral aberration that corresponds to the image height ratio H of the imaging lens, and FIG. 12 shows a spherical aberration (mm), an astigmatism (mm), and a distortion (%), respectively. As shown in FIGS. 11 and 12, according to the imaging lens of Numerical Data Example 4, the aberrations are also satisfactorily corrected.

Numerical Data Example 5

Basic Data are shown below.

f = 3.88 mm, Fno = 2.4, ω = 36.4°
Unit: mm

Surface Data

| Surface Number i | r | d | nd | vd |
|---|---|---|---|---|
| (Object) | ∞ | ∞ | | |
| 1* (Stop) | 1.655 | 0.446 | 1.5346 | 56.2(=vd1) |
| 2* | 46.196 | 0.020 | | |
| 3* | 3.129 | 0.262 | 1.6355 | 23.9(=vd2) |
| 4* | 1.657 | 0.315 | | |
| 5* | −523.041 | 0.396 | 1.5438 | 55.8(=vd3) |
| 6* | −6.320 | 0.494 | | |
| 7* | −2.145 | 0.729 | 1.5438 | 55.8(=vd4) |
| 8* | −0.898 | 0.038 | | |
| 9* | −2.170 | 0.329 | 1.6355 | 23.9(=vd5) |
| 10* | −2.779 | 0.092 | | |
| 11* | 7.749 | 0.514 | 1.5346 | 56.2(=vd6) |
| 12* | 1.096 | 0.500 | | |
| 13 | ∞ | 0.300 | 1.5168 | 64.2 |
| 14 | ∞ | 0.514 | | |
| (Image plane) | ∞ | | | |

$f1 = 3.19$ mm
$f2 = -5.90$ mm
$f3 = 11.71$ mm
$f4 = 2.35$ mm
$f5 = -19.58$ mm
$f6 = -2.46$ mm
$f12 = 5.53$ mm
$f56 = -2.03$ mm

Aspheric Surface Data

First Surface $k = -5.336E-01, A_4 = 1.656E-02, A_6 = 6.433E-03, A_8 = 1.373E-02,$
$A_{10} = 1.355E-03$
Second Surface $k = 0.000, A_4 = -8.518E-03, A_6 = 5.823E-02, A_8 = -6.831E-03,$
$A_{10} = -1.486E-02$
Third Surface $k = -9.815, A_4 = -5.808E-02, A_6 = 1.144E-01, A_8 = -2.665E-02,$
$A_{10} = -4.342E-02$
Fourth Surface $k = 1.423, A_4 = -1.371E-01, A_6 = 4.496E-02, A_8 = 4.462E-02,$
$A_{10} = -7.843E-02$
Fifth Surface $k = 0.000, A_4 = -4.419E-02, A_6 = -2.949E-02, A_8 = 1.409E-03,$
$A_{10} = 7.812E-02$
Sixth Surface $k = 1.284, A_4 = -3.032E-02, A_6 = 2.719E-02, A_8 = -5.502E-02,$
$A_{10} = 5.765E-02$
Seventh Surface $k = -1.532, A_4 = -2.683E-03, A_6 = 5.644E-03, A_8 = 4.117E-03,$
$A_{10} = 1.675E-03$
Eighth Surface $k = -1.164, A_4 = 1.251E-01, A_6 = -9.504E-02, A_8 = 4.694E-02,$
$A_{10} = -8.551E-03$
Ninth Surface $k = 1.668E-01, A_4 = -2.860E-02, A_6 = 1.693E-02, A_8 = -3.905E-03,$
$A_{10} = -1.162E-03$
Tenth Surface $k = -1.574E-01, A_4 = -8.418E-03, A_6 = 2.701E-04, A_8 = 4.522E-04,$
$A_{10} = 2.969E-04$
Eleventh Surface $k = -1.573E+03, A_4 = -4.054E-02, A_6 = 6.479E-03, A_8 = 2.626E-04,$
$A_{10} = -7.078E-05$
Twelfth Surface $k = -8.511, A_4 = -3.726E-02, A_6 = 8.190E-03, A_8 = -1.343E-03,$
$A_{10} = 6.621E-05$ The values of the respective conditional expressions are as follows:

$$f56/f=-0.52$$

$$f12/f=1.43$$

$$f1/f2=-0.54$$

$$f3/f=3.02$$

$$f4/f5=-0.12$$

Accordingly, the imaging lens of Numerical Data Example 5 satisfies the above-described conditional expressions. A distance on the optical axis X from the object-side surface of the first lens L1 to the image plane IM (length in air) is 4.85 mm, and downsizing of the imaging lens is attained.

Figure 14:
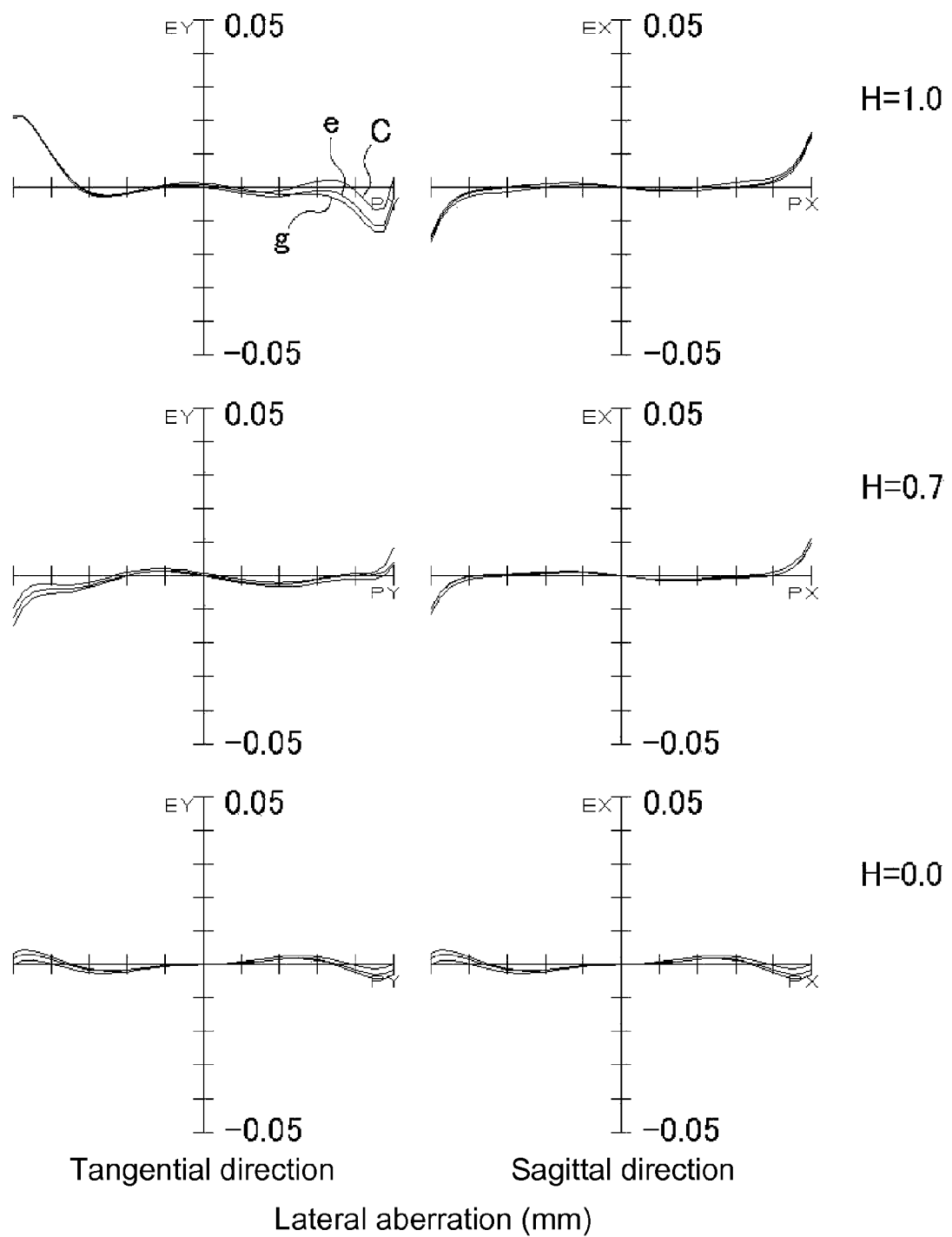
FIG. 14 is an aberration diagram showing a lateral aberration of the imaging lens of FIG. 13.
Figure 15:
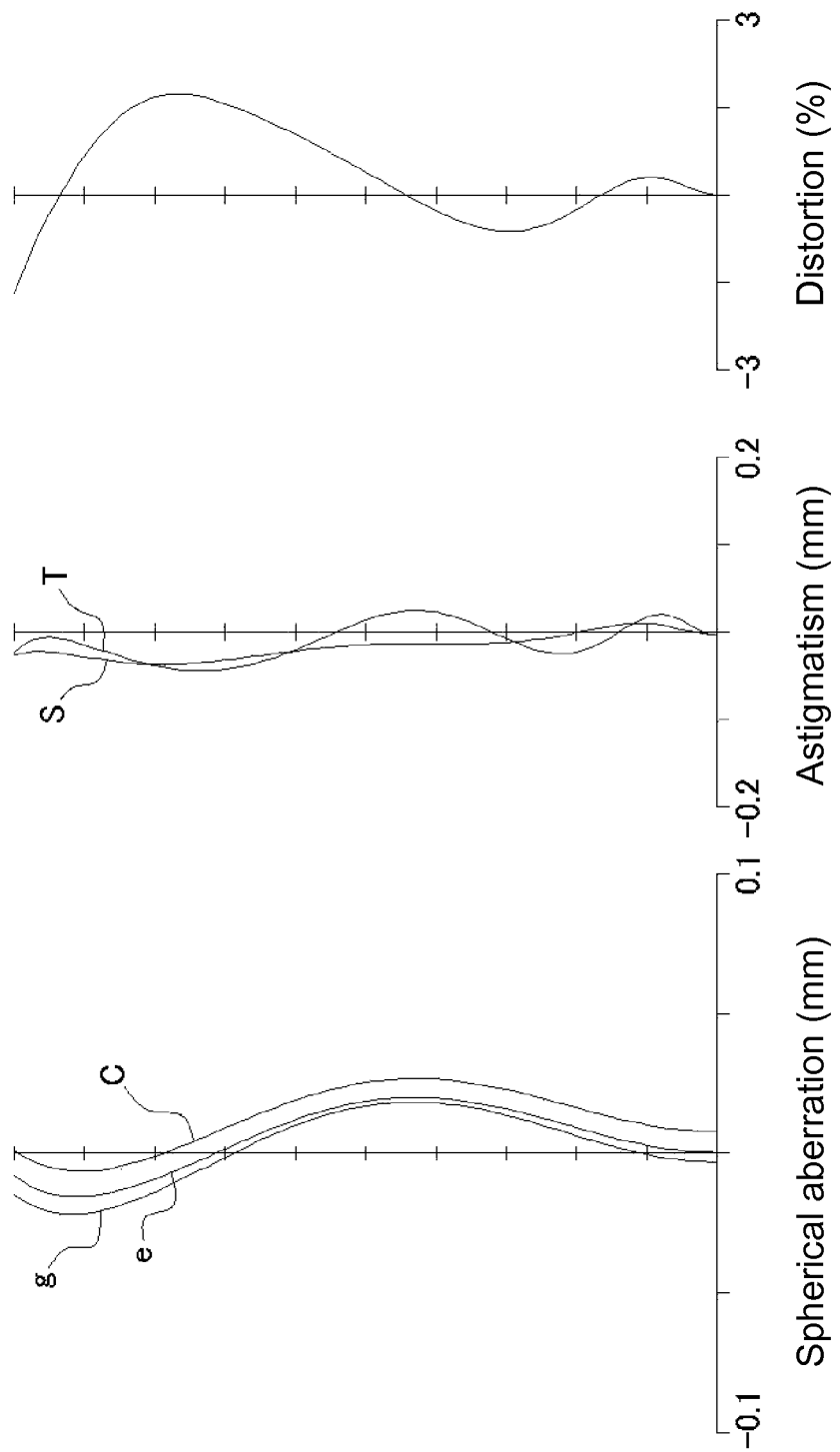
FIG. 15 is an aberration diagram showing a spherical aberration, astigmatism, and a distortion of the imaging lens of FIG. 13.

FIG. 14 shows the lateral aberration that corresponds to the image height ratio H of the imaging lens, and FIG. 15 shows a spherical aberration (mm), an astigmatism (mm), and a distortion (%), respectively. As shown in FIGS. 14 and 15, according to the imaging lens of Numerical Data Example 5, the aberrations are satisfactorily corrected.

As described above, according to the imaging lens of the embodiment, it is possible to attain an angle of view (2ω) of 80° or greater. Here, angles of view of the imaging lenses in Numerical Data Examples 1 to 5 are as wide as 68.4° to 85.8°. According to the imaging lens of the embodiment, it is possible to take an image in wider range than the one that can be taken by a conventional imaging lens.

Furthermore, in order to improve camera performances, a high pixel count imaging element has been frequently used in combination with an imaging lens. In case of those high pixel-count imaging elements, since a light-receiving area of each pixel is smaller, an image taken tends to be dark. To solve this problem, there is a method to improve light-receiving sensitivity using an electrical circuit. However, since a noise component, which does not directly contribute to image formation, is also amplified, when the light-receiving sensitivity increases, it is necessary to provide another circuit for reducing noise. According to the imaging lenses of Numerical Data Examples 1 to 5, the Fno is as small as 2.2 to 2.6. According to the imaging lens of the embodiment, it is possible to obtain sufficiently bright image without providing the above-described electric circuit.

Accordingly, when the imaging lens of the embodiment is mounted in an image-forming optical system, such as built-in cameras of cellular phones, portable information terminals, and smartphones, digital still cameras, security cameras, onboard cameras, and network cameras, it is achievable to have high functionality and downsize the cameras.

The present invention can be applied to imaging lenses to be mounted in relatively small cameras, such as built-in cameras of portables devices including cellular phones, smartphones, and portable information terminals, digital still cameras, security cameras, onboard cameras, and network cameras.

The disclosure of Japanese Patent Application No. 2012-180834, filed on Aug. 17, 2012, is incorporated in the application by reference.

While the invention has been explained with reference to the specific embodiments of the invention, the explanation is illustrative and the invention is limited only by the appended claims.

What is claimed is:

1. An imaging lens comprising:
a first lens having positive refractive power;
a second lens having negative refractive power;
a third lens;
a fourth lens;
a fifth lens; and
a sixth lens, arranged in this order from an object side to an image plane side,
wherein said fifth lens is formed in a shape so that a surface thereof on the object side and a surface thereof on the image plane side have negative curvature radii,
said sixth lens is formed in a shape so that a surface thereof on the object side and a surface thereof on the image plane side have positive curvature radii, and
said fourth lens has an Abbe's number vd4, said fifth lens has an Abbe's number vd5, and said sixth lens has an Abbe's number vd6 so that the following conditional expressions are satisfied:

$$45<vd4<75$$

$$20<vd5<40$$

$$45<vd6<75.$$

2. The imaging lens according to claim 1, wherein said first lens has an Abbe's number vd1, said second lens has an Abbe's number vd2, and said third lens has an Abbe's number vd3 so that the following conditional expressions are satisfied:

$$45<vd1<75$$

$$20<vd2<40$$

$$45<vd3<75.$$

3. The imaging lens according to claim 1, wherein said fifth lens and said sixth lens have a composite focal length f56 so that the following conditional expression is satisfied:

$$-1.0<f56/f<-0.3$$

where f is a focal length of a whole lens system.

4. The imaging lens according to claim 1, wherein said first lens and said second lens have a composite focal length f12 so that the following conditional expression is satisfied:

$$1.1<f12/f<3.0$$

where f is a focal length of a whole lens system.

5. The imaging lens according to claim 1, wherein said first lens has a focal length f1 and said second lens has a focal length f2 so that the following conditional expression is satisfied:

$$-0.8<f1/f2<-0.3.$$

6. The imaging lens according to claim 1, wherein said third lens has a focal length f3 so that the following conditional expression is satisfied:

$$1.0<f3/f<5.0$$

where f is a focal length of a whole lens system.

7. The imaging lens according to claim 1, wherein said fourth lens has a focal length f4 and said fifth lens has a focal length f5 so that the following conditional expression is satisfied:

$$-0.4<f4/f5<-0.1.$$

8. An imaging lens comprising:
a first lens having positive refractive power;
a second lens having negative refractive power;
a third lens;
a fourth lens;
a fifth lens; and a sixth lens, arranged in this order from an object side to an image plane side,
wherein said first lens is formed in a shape so that a surface thereof on the object side and a surface thereof on the image plane side have positive curvature radii,
said third lens is formed in a shape so that a surface thereof on the image plane side has a negative curvature radius,
said fifth lens is formed in a shape so that a surface thereof on the object side and a surface thereof on the image plane side have negative curvature radii, and
said fourth lens has a focal length f4 and said fifth lens has a focal length f5 so that the following conditional expression is satisfied:

$$-0.4 < f4/f5 < -0.1.$$

9. The imaging lens according to claim 8, wherein said first lens has an Abbe's number vd1, said second lens has an Abbe's number vd2, said third lens has an Abbe's number vd3, said fourth lens has an Abbe's number vd4, said fifth lens has an Abbe's number vd5, and said sixth lens has an Abbe's number vd6 so that the following conditional expressions are satisfied:

$$45 < vd1 < 75$$

$$20 < vd2 < 40$$

$$45 < vd3 < 75$$

$$45 < vd4 < 75$$

$$20 < vd5 < 40$$

$$45 < vd6 < 75.$$

10. The imaging lens according to claim 8, wherein said fifth lens and said sixth lens have a composite focal length f56 so that the following conditional expression is satisfied:

$$-1.0 < f56/f < -0.3$$

where f is a focal length of a whole lens system.

11. The imaging lens according to claim 8, wherein said first lens and said second lens have a composite focal length f12 so that the following conditional expression is satisfied:

$$1.1 < f12/f < 3.0$$

where f is a focal length of a whole lens system.

12. The imaging lens according to claim 8, wherein said first lens has a focal length f1 and said second lens has a focal length f2 so that the following conditional expression is satisfied:

$$-0.8 < f1/f2 < -0.3.$$

13. The imaging lens according to claim 8, wherein said third lens has a focal length f3 so that the following conditional expression is satisfied:

$$1.0 < f3/f < 5.0$$

where f is a focal length of a whole lens system.

14. An imaging lens comprising:
a first lens having positive refractive power;
a second lens having negative refractive power;
a third lens;
a fourth lens;
a fifth lens having negative refractive power; and
a sixth lens, arranged in this order from an object side to an image plane side,
wherein said first lens is formed in a shape so that a surface thereof on the object side and a surface thereof on the image plane side have positive curvature radii,
said third lens is formed in a shape so that a surface thereof on the image plane side has a negative curvature radius, and
said fourth lens has a focal length f4 and said fifth lens has a focal length f5 so that the following conditional expression is satisfied:

$$-0.4 < f4/f5 < -0.1.$$

15. The imaging lens according to claim 14, wherein said first lens has an Abbe's number vd1, said second lens has an Abbe's number vd2, said third lens has an Abbe's number vd3, said fourth lens has an Abbe's number vd4, said fifth lens has an Abbe's number vd5, and said sixth lens has an Abbe's number vd6 so that the following conditional expressions are satisfied:

$$45 < vd1 < 75$$

$$20 < vd2 < 40$$

$$45 < vd3 < 75$$

$$45 < vd4 < 75$$

$$20 < vd5 < 40$$

$$45 < vd6 < 75.$$

16. The imaging lens according to claim 14, wherein said fifth lens and said sixth lens have a composite focal length f56 so that the following conditional expression is satisfied:

$$-1.0 < f56/f < -0.3$$

where f is a focal length of a whole lens system.

17. The imaging lens according to claim 14, wherein said first lens and said second lens have a composite focal length f12 so that the following conditional expression is satisfied:

$$1.1 < f12/f < 3.0$$

where f is a focal length of a whole lens system.

18. The imaging lens according to claim 14, wherein said first lens has a focal length f1 and said second lens has a focal length f2 so that the following conditional expression is satisfied:

$$-0.8 < f1/f2 < -0.3.$$

19. The imaging lens according to claim 14, wherein said third lens has a focal length f3 so that the following conditional expression is satisfied:

$$1.0 < f3/f < 5.0$$

where f is a focal length of a whole lens system.

* * * * *